US012124262B2

(12) United States Patent
Ingvalson et al.

(10) Patent No.: US 12,124,262 B2
(45) Date of Patent: Oct. 22, 2024

(54) SMART SCHEDULING FOR AUTONOMOUS MACHINE OPERATION

(71) Applicant: THE TORO COMPANY, Bloomington, MN (US)

(72) Inventors: Ryan Douglas Ingvalson, Sewickley, PA (US); Alexander Steven Frick, Farmington, MN (US); Jason Thomas Kraft, Stillwater, MN (US); Timothy Bertram Cleveland, Lakeville, MN (US)

(73) Assignee: THE TORO COMPANY, Bloomington, MN (US)

( * ) Notice: Subject to any disclaimer, the term of this patent is extended or adjusted under 35 U.S.C. 154(b) by 245 days.

(21) Appl. No.: 17/436,276

(22) PCT Filed: Mar. 19, 2020

(86) PCT No.: PCT/US2020/023507
§ 371 (c)(1),
(2) Date: Sep. 3, 2021

(87) PCT Pub. No.: WO2020/197913
PCT Pub. Date: Oct. 1, 2020

(65) Prior Publication Data
US 2022/0129000 A1    Apr. 28, 2022

Related U.S. Application Data

(60) Provisional application No. 62/822,342, filed on Mar. 22, 2019.

(51) Int. Cl.
*G05D 1/00* (2024.01)

(52) U.S. Cl.
CPC ......... *G05D 1/0214* (2013.01); *G05D 1/0055* (2013.01); *G05D 1/0088* (2013.01); *G05D 1/0219* (2013.01)

(58) Field of Classification Search
CPC .. G05D 1/0055; G05D 1/0088; G05D 1/0214; G05D 1/0219; G05D 1/0274; G05D 2201/0208; G06Q 10/06314
See application file for complete search history.

(56) References Cited

U.S. PATENT DOCUMENTS 8,295,979 B2   10/2012   Thacher et al.
10,496,063 B1 *  12/2019   Ebrahimi Afrouzi ......................
                                              A47L 9/2852

(Continued)

FOREIGN PATENT DOCUMENTS

EP    1776623    12/2011
EP    2767150    3/2019

(Continued)

OTHER PUBLICATIONS

Extended European Search Report for European Patent Application No. 22209859.2, mailed Feb. 24, 2023 (11 pages).

(Continued)

*Primary Examiner* — Jason Holloway
*Assistant Examiner* — Blake A Wood
(74) *Attorney, Agent, or Firm* — Mueting Raasch Group

(57) ABSTRACT

This disclosure provides an autonomous machine system having a scheduling controller configured to determine one or more windows of availability over a time period when the autonomous machine is allowed to operate to perform one or more operational tasks; determine a total operation time over the time period; and determine an operating schedule for a work region that assigns one or more operational tasks to the one or more windows of availability based on the total operation time. The autonomous machine may be commanded to operate in the work region according to the operating schedule.

18 Claims, 20 Drawing Sheets

(56) References Cited

U.S. PATENT DOCUMENTS

| | | |
|---|---|---|
| 10,874,045 B2 | 1/2020 | Doust |
| 10,571,905 B2 | 2/2020 | Yamamura |
| 10,785,907 B2 | 9/2020 | Doughty et al. |
| 11,400,823 B1* | 8/2022 | Sampath .................. B60L 58/12 |
| 2007/0192910 A1* | 8/2007 | Vu ............................ B25J 19/06 |
| | | 901/17 |
| 2014/0207280 A1* | 7/2014 | Duffley ................. A47L 9/2857 |
| | | 700/257 |
| 2015/0212520 A1 | 7/2015 | Artés et al. |
| 2016/0174459 A1 | 6/2016 | Balutis et al. |
| 2016/0282862 A1* | 9/2016 | Duffley ................. A47L 9/2857 |
| 2017/0265703 A1* | 9/2017 | Park ......................... A47L 9/009 |
| 2017/0280622 A1 | 10/2017 | Yamamura |
| 2018/0137728 A1* | 5/2018 | Hahn ............... G08B 13/19697 |
| 2018/0344116 A1* | 12/2018 | Schriesheim .......... A47L 9/2857 |
| 2020/0029774 A1* | 1/2020 | Mellinger, III ..... A47L 11/4061 |
| 2020/0077863 A1* | 3/2020 | Huang ................ A47L 11/4061 |
| 2020/0319640 A1* | 10/2020 | Vogel .................... A47L 9/2842 |
| 2021/0132624 A1 | 5/2021 | Andriolo et al. |
| 2021/0373558 A1 | 12/2021 | Schneider et al. |
| 2021/0400863 A1 | 12/2021 | Matsuhisa et al. |

FOREIGN PATENT DOCUMENTS

| | | |
|---|---|---|
| WO | 2018/197665 | 11/2018 |
| WO | 2020/197913 | 10/2020 |

OTHER PUBLICATIONS

International Search Report and Written Opinion for International Application No. PCT/US2020/023507, mailed Sep. 14, 2020 (20 pages).

International Preliminary Report on Patentability for International Application No. PCT/US2020/023507, mailed Jun. 29, 2021 (22 pages).

* cited by examiner

- Task Slip Example: NO CATCH-UP:

— Round 1: CZ1 Task, CZ2 Task, CZ3 Task
  — Round 2: CZ1 Task,...*DELAY... CZ2 Task is partially complete, and CZ3 Task is wholly incomplete*
  — Round 3:
    - Finish CZ2 Task, CZ3 Task (these Tasks come from Round 2)
    - CZ1 Task (nominally the first task of Round 3)
    - CANCELLED: CZ2 Task, CZ3 Task ...*continue to next week, new task order...*
  — Round 1: CZ2 Task, CZ3 Task, CZ1 Task

- Task Slip Example: CATCH-UP:
  - Round 1: CZ1 Task, CZ2 Task, CZ3 Task
  - Round 2: CZ1 Task,...*DELAY... CZ2 Task is partially complete, and CZ3 Task is wholly incomplete*
    - Finish CZ2 Task from Round 2
    - CZ3 Task from Round 2
    - CZ1 Task (nominally from Round 3)
    - CZ2 Task (nominally from Round 3)
    - CANCELLED: CZ3 Task
    - *...continue to next week, new task order...*
  - Round 1: CZ3 Task, CZ1 Task, CZ2 Task

SMART SCHEDULING FOR AUTONOMOUS MACHINE OPERATION

The present application is a 35 U.S.C. § 371 U.S. National Stage of International Application No. PCT/US2020/023507, filed Mar. 19, 2020, which claims the benefit of U.S. Provisional Application Ser. No. 62/822,342, filed Mar. 22, 2019, all of which are incorporated by reference in their entireties.

The present technology is generally related to autonomous machines and, in particular, to operating autonomous grounds maintenance machines.

Grounds maintenance machines, such as lawn and garden machines, may perform a variety of tasks. For instance, powered lawn mowers may be used by both homeowners and professionals alike to maintain grass areas within a property or yard. Some lawn mowers have the capability to autonomously perform grass cutting within a predefined boundary or work region.

SUMMARY

The techniques of this disclosure generally relate to providing autonomous machine functionality for determining an operating schedule for the autonomous machine that facilitates maintenance of a work region. These techniques can facilitate the ease of scheduling autonomous machine operation while properly maintaining the work region. Some of these techniques can adapt to various changing conditions in a manner that does may require user input to properly maintain the work region.

In independent aspect A1, a method for operating an autonomous machine includes determining one or more windows of availability over a time period when the autonomous machine is allowed to operate to perform one or more operational tasks. The method also includes determining a total operation time over the time period. The method also includes determining an operating schedule for a work region that assigns one or more operational tasks to the one or more windows of availability based the total operation time.

In aspect A2, aspect A1 further includes commanding the autonomous machine to operate in the work region according to the operating schedule.

In aspect A3, any preceding A aspect further includes receiving user input indicative of the total operation time, the one or more windows of availability, one or more windows of unavailability, or any combination of one or more of these from a user interface device.

In aspect A4, any preceding A aspect further includes wherein determining the operating schedule includes assigning one or more of the operational tasks to one or more rounds and the one or more windows of availability.

In aspect A5, aspect A4 further includes wherein an order of distinct operational tasks assigned to each round is the same.

In aspect A6, any preceding A aspect further includes wherein one or more of the operational tasks is split between more than one window of availability.

In aspect A7, any preceding A aspect further includes wherein each of the one or more operational tasks is associated with a containment zone including only a portion of the work region.

In aspect A8, any preceding A aspect further includes wherein determining the operating schedule is based on determining a recommended total operation time based on training of the autonomous machine.

In aspect A9, any preceding A aspect further includes wherein determining the operating schedule is based on determining a recommended operation time for each containment zone in the work region.

In aspect A10, any preceding A aspect further includes wherein determining the operating schedule is further based on user input that indicates a modification to a recommended operation time for each containment zone.

In aspect A11, aspect A10 further includes wherein the modification to the recommended operation time for each containment zone includes a modification of frequency, duration, or both of the one or more operational tasks.

In aspect A12, any preceding A aspect further includes wherein determining the operating schedule is based on determining a user-based operation time for each containment zone.

In aspect A13, any preceding A aspect further includes displaying progress of the operating schedule for the time period on a user interface device.

In aspect A14, any preceding A aspect further includes prioritizing specific user-requested tasks over scheduled operational tasks in the operating schedule.

In aspect A15, any preceding A aspect further includes prioritizing at least one operational task to cover an isolated containment zone before at least one operational task to cover an autonomous containment zone in the operating schedule.

In aspect A16, any preceding A aspect further includes wherein prioritizing at least one operational task to cover an isolated containment zone includes determining that the isolated containment zone is not isolated before prioritizing the at least one operational task to cover the isolated containment zone.

In aspect A17, any preceding A aspect further includes determining a revised operating schedule based on the operating schedule defined as an existing operating schedule in response to a delay of one or more operational tasks.

In aspect A18, aspect A17 further includes wherein determining the revised operating schedule includes assigning more operational tasks to a round than would have been assigned to the round in the existing operating schedule.

In aspect A19, aspect A18 further includes wherein determining the revised operating schedule includes assigning the same number of operational tasks in a round than would have been assigned to the round in the existing operating schedule.

In aspect A20, any one of aspects A17 to A19 further includes wherein determining the revised operating schedule includes assigning wholly incomplete operational tasks to a subsequent round.

In aspect A21, any preceding A aspect further includes wherein determining the operating schedule for the work region is further based on environmental information.

In independent aspect B1, an autonomous machine includes a housing coupled to a maintenance implement, a propulsion controller operably coupled to a set of wheels, and a scheduling controller operably coupled to the propulsion controller. The scheduling controller includes processing circuitry configured to: determine one or more windows of availability over a time period when the autonomous machine is allowed to operate to perform one or more operational tasks; determine a total operation time over the time period; and determine an operating schedule for a work region that assigns one or more operational tasks to the one or more windows of availability based on the total operation time.

In aspect B2, aspect B1 further includes wherein the propulsion controller is configured to control speed and rotational direction of each wheel of the set of wheels independently, thereby controlling both speed and direction of the housing over a ground surface.

In aspect B3, aspect B1 or B2 further includes a navigation controller having processing circuitry configured to command the propulsion controller to propel the autonomous machine to operate in the work region according to the operating schedule.

In aspect C1, any B aspect is further configured to carry out any method according to any A aspect.

The summary is not intended to describe each embodiment or every implementation of this disclosure. A more complete understanding will become apparent, for example, in view of the detailed description, the claims, and the accompanying drawings.

BRIEF DESCRIPTION OF THE DRAWINGS

Illustrative embodiments are described with reference to the figures of the drawings, wherein:

FIG. 16 is an illustration of one example of a "no catch-up" process for revising an operating schedule that may be used with, for example, the autonomous grounds maintenance machine of FIG. 1.

FIG. 17 is an illustration of one example of a "catch-up" process for revising an operating schedule that may be used with, for example, the autonomous grounds maintenance machine of FIG. 1.

Figure 1:
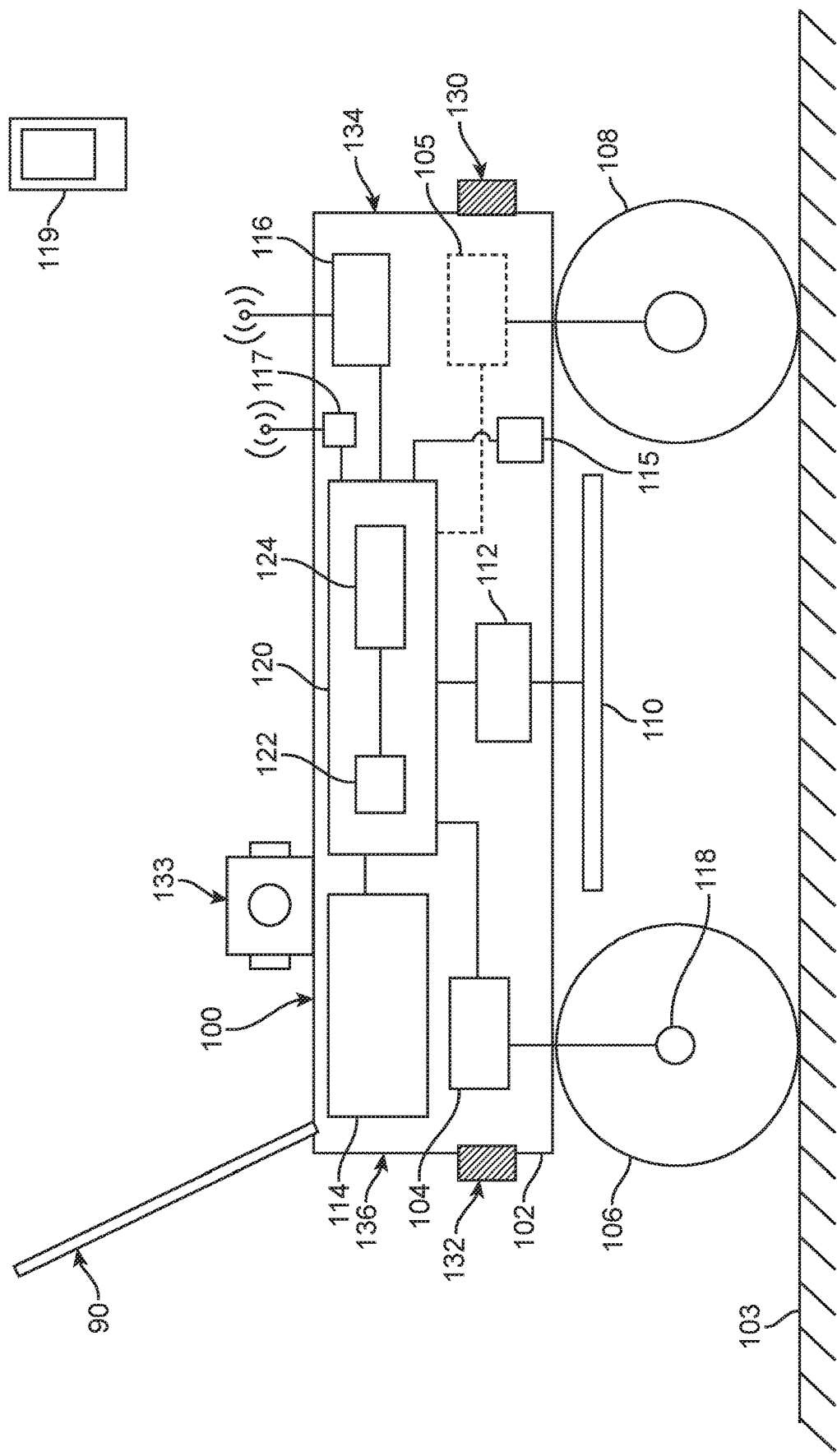
FIG. 1 is a diagrammatic elevation side view of one example of an autonomous grounds maintenance machine configured for smart scheduling.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various illustrative embodiments described herein. The lack of illustration/description of such structure/components in a particular figure, however, is not to be interpreted as limiting the scope of the various embodiments in any way.

DETAILED DESCRIPTION

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." The term "and/or" (if used) means one or all of the listed elements or a combination of any two or more of the listed elements. The term "i.e." is used as an abbreviation for the Latin phrase id est and means "that is." The term "e.g.," is used as an abbreviation for the Latin phrase exempli gratia and means "for example."

Embodiments of the present disclosure provide autonomous machine functionality for determining an operating schedule that facilitates maintenance of a work region. This autonomous machine functionality may facilitate ease of scheduling autonomous machine operation while properly maintaining the work region. This functionality may also revise the operating schedule to adapt to changing conditions in a manner that may not require user input to properly maintain the work region.

While described herein in illustrative examples as an autonomous mower, such a configuration is only illustrative, as systems and methods described herein also have application to other autonomous machines including, for example, commercial mowing products, other ground working machines or vehicles (e.g., debris blowers/vacuums, aerators, dethatchers, material spreaders, snow throwers, weeding machines for weed remediation), indoor working vehicles such as vacuums and floor scrubbers/cleaners (e.g., that may encounter obstacles), construction and utility vehicles (e.g., trenchers), observation vehicles, and load transportation (e.g., including people and things, such as people movers and hauling equipment). Furthermore, the autonomous machines described herein may employ various one or more types of navigation, such as random, modified random, or specific path planning, to carry out their intended functionality.

It is noted that the terms "have," "include," "comprises," and variations thereof, do not have a limiting meaning, and are used in their open-ended sense to generally mean "including, but not limited to," where the terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or while the machine 100 is in an operating configuration (e.g., while the machine 100 is positioned such that wheels 106 and 108 rest upon a generally horizontal ground surface 103 as shown in FIG. 1). These terms are used only to simplify the description, however, and not to limit the interpretation of any embodiment described.

The techniques of this disclosure may be used with any suitable autonomous machine. FIG. 1 illustrates one example of an autonomous grounds maintenance machine (e.g., an autonomously operating vehicle, such as an autonomous lawn mower 100) of a lawn mowing system (for simplicity of description, the mower 100 is illustrated schematically). The mower 100 may include functionality to determine an operating schedule to facilitate maintenance of a work region.

As shown in this view, the mower 100 may include a housing 102 (e.g., frame or chassis with a shroud) that carries and/or encloses various components of the mower as described below. The mower 100 may further include ground support members, such as wheels, rollers, or tracks. In the illustrated embodiment, ground support members shown includes one or more rear wheels 106 and one or more front wheels 108, that support the housing 102 upon a ground (grass) surface 103. As illustrated, the front wheels 108 are used to support a front-end portion 134 of the mower housing 102 and the rear wheels 106 are used to support the rear end portion 136 of the mower housing.

One or both rear wheels 106 may be driven by a propulsion system (e.g., including one or more electric wheel motors 104) to propel the mower 100 over the ground surface 103. In some embodiments, the front wheels 108 may freely caster relative to the housing 102 (e.g., about vertical axes). In such a configuration, mower direction may be controlled via differential rotation of the two rear wheels 106 in a manner similar to some existing zero-turn-radius (ZTR) riding mowers. That is to say, the propulsion system may include a separate wheel motor 104 for each of a left and right rear wheel 106 so that speed and direction of each rear wheel may be independently controlled. In addition, or alternatively, the front wheels 108 could be actively steerable by the propulsion system (e.g., including one or more steer motors 105) to assist with control of mower 100 direction, and/or could be driven by the propulsion system (i.e., to provide a front-wheel or all-wheel drive mower).

An implement (e.g., a grass cutting element, such as a blade 110) may be coupled to a cutting motor 112 (e.g., implement motor) carried by the housing 102. When the motors 112 and 104 are energized, the mower 100 may be propelled over the ground surface 103 such that vegetation (e.g., grass) over which the mower passes is cut by the blade 110. While illustrated herein using only a single blade 110 and/or motor 112, mowers incorporating multiple blades, powered by single or multiple motors, are contemplated within the scope of this disclosure. Moreover, while described herein in the context of one or more conventional "blades," other cutting elements including, for example, disks, nylon string or line elements, knives, cutting reels, etc., are certainly possible without departing from the scope of this disclosure. Still further, embodiments combining various cutting elements, e.g., a rotary blade with an edge-mounted string trimmer, are also contemplated.

The mower 100 may further include a power source, which in one embodiment, is a battery 114 having a lithium-based chemistry (e.g., lithium-ion). Other embodiments may utilize batteries of other chemistries, or other power source technologies (e.g., solar power, fuel cell, internal combustion engines) altogether, without departing from the scope of this disclosure. It is further noted that, while shown as using independent blade and wheel motors, such a configuration is illustrative only as embodiments wherein blade and wheel power is provided by a single motor are also contemplated.

The mower 100 may further include one or more sensors to provide location data. For instance, some embodiments may include a global positioning system (GPS) receiver 116 (or other position sensor that may provide similar data) that is adapted to estimate a position of the mower 100 within a work region and provide such information to a controller 120 (described below). In other embodiments, one or more of the wheels 106, 108 may include encoders 118 that provide wheel rotation/speed information that may be used to estimate mower position (e.g., based upon an initial start position) within a given work region. The mower 100 may also include a sensor 115 adapted to detect a boundary wire, which could be used in addition to other navigational techniques described herein.

The mower 100 may include one or more front obstacle detection sensors 130 and one or more rear obstacle detection sensors 132, as well as other sensors, such as side obstacle detection sensors (not shown). The obstacle detection sensors 130, 132 may be used to detect an obstacle in the path of the mower 100 when traveling in a forward or reverse direction, respectively. The mower 100 may be capable of mowing while moving in either direction. As illustrated, the sensors 130, 132 may be located at the front-end portion 134 or rear end portion 136 of the mower 100, respectively.

The sensors 130, 132 may use contact sensing, non-contact sensing, or both types of sensing. For example, both contact and non-contact sensing may be enabled concurrently or only one type of sensing may be used depending on the status of the mower 100 (e.g., within a zone or traveling between zones). One example of contact sensing includes using a contact bumper protruding from the housing 102, or the housing itself, that can detect when the mower 100 has contacted the obstacle. Non-contact sensors may use acoustic or light waves to detect the obstacle, sometimes at a distance from the mower 100 before contact with the obstacle (e.g., using infrared, radio detection and ranging (radar), light detection and ranging (lidar), etc.).

The mower 100 may include one or more vision-based sensors to provide localization data, such as position, orientation, or velocity. The vision-based sensors may include one or more cameras 133 that capture or record images for use with a vision system. The cameras 133 may be described as part of the vision system of the mower 100. Types of images include, for example, training images and/or operational images.

The one or more cameras may be capable of detecting visible light, non-visible light, or both. The one or more cameras may establish a total field of view of at least 30 degrees, at least 45 degrees, at least 60 degrees, at least 90 degrees, at least 120 degrees, at least 180 degrees, at least 270 degrees, or even at least 360 degrees, around the autonomous machine (e.g., mower 100). The field of view may be defined in a horizontal direction, a vertical direction, or both directions. For example, a total horizontal field of view may be 360 degrees, and a total vertical field of view may be 45 degrees. The field of view may capture image data above and below the height of the one or more cameras.

In some embodiments, the mower 100 includes four cameras 133. One camera 133 may be positioned in each of one or more of directions including a forward direction, a reverse direction, a first side direction, and a second side direction (e.g., Cardinal directions relative to the mower 100). One or more camera directions may be positioned orthogonal to one or more other cameras 133 or positioned opposite to at least one other camera 133. The cameras 133 may also be offset from any of these directions (e.g., at a 45 degree or another non-right angle).

The mower 100 may be guided along a path, for example, in a manual manner using handle 90. In particular, manual direction of the mower 100 may be used during a training mode to learn a work region or a boundary associated with the work region. The handle 90 may extend outward and upward from a rear end portion 136 of the mower 100.

The camera 133 positioned in a forward direction may have a position and orientation that represents a pose of the autonomous machine. In some embodiments, the position and orientation of the cameras may be defined relative to a geometric center of the mower 100 or relative to one of the edges of the mower 100.

As used herein, the term "pose" refers to a position and an orientation. The pose may be a six-degrees of freedom pose (6DOF pose), which may include all position and orientation parameters for a three-dimensional space. Pose data may include a three-dimensional position and a three-dimensional orientation. For example, the position may include at least one position parameter selected from: an x-axis, a y-axis, and a z-axis coordinate (e.g., using a Cartesian coordinate system). Any suitable angular orientation representations may be used. Non-limiting examples of angular orientation representations include a yaw, pitch, and roll representation, a Rodrigues' representation, a quaternions representation, and a direction cosine matrix (DCM) representation may also be used alone or in combination. In one example, the orientation may include at least one orientation parameter selected from a yaw (e.g., vertical z-axis orientation), a pitch (e.g., a transverse y-axis orientation), and a roll (e.g., a longitudinal x-axis orientation).

Sensors of the mower 100 may also be described as either vision-based sensors and non-vision-based sensors. Vision-based sensors may include cameras 133 that are capable of recording images. The images may be processed and used to build a three-dimensional (3D) point cloud or used for optical odometry (e.g., optical encoding). Non-vision-based sensors may include any sensors that are not cameras 133.

For example, a wheel encoder that uses optical (e.g., photodiode), magnetic, or capacitive sensing to detect wheel revolutions may be described as a non-vision-based sensor that does not utilize a camera. Wheel encoding data from a wheel encoder may be also described as odometry data.

Optical encoding may be used by taking a series or sequence of images and comparing features in the images to determine or estimate a distance traveled between the images. Optical encoding may be less susceptible to wheel slippage than a wheel encoder for determining distance or speed.

In addition to the sensors described above, other sensors now known or later developed may also be incorporated into the mower 100.

The mower 100 may also include a controller 120 adapted to monitor and control various mower functions. The controller 120 may include a processor 122 that receives various inputs and executes one or more computer programs or applications stored in memory 124. The memory 124 may include computer-readable instructions or applications that, when executed, e.g., by the processor 122, cause the controller 120 to perform various calculations and/or issue commands. That is to say, the processor 122 and memory 124 may together define a computing apparatus operable to process input data and generate the desired output to one or more components/devices. For example, the processor 122 may receive various input data including positional data from the GPS receiver 116 and/or encoders 118 and generate speed and steering angle commands to the drive wheel motor(s) 104 to cause the drive wheels 106 to rotate (at the same or different speeds and in the same or different directions). In other words, the controller 120 may control the steering angle and speed of the mower 100, as well as the speed and operation of the cutting blade.

Reference herein may be made to various parameters, data, or data structures, which may be handled in a controller 120, for example, by being processed by a processor 122 or stored in or retrieved from a memory 124.

The controller 120 may use the processor 122 and memory 124 in various different systems. In particular, one or more processors 122 and memory 124 may be included in each different system. In some embodiments, the controller 120 may at least partially define a vision system, which may include a processor 122 and memory 124. The controller 120 may also at least partially define a navigation system, which may include a processor 122 and memory 124 separate from the processor 122 and memory 124 of the vision system.

Each system may also be described as having its own controller 120. For example, the vision system may be described as including one controller 120 and the navigation system may be described as having another controller 120. As such, the mower 100 may be described as having multiple controllers 120. In general, as used herein, the term "controller" may be used to describe components of a "system" that provide commands to control various other components of the system.

In addition, the mower 100 may be in operative communication with a separate device, such as a smartphone or remote computer. A problem area or obstacle may be identified, or defined, using an application on the smartphone or remote computer, or the like. For example, a user may train a particular type of boundary by navigating the mower 100 along a path and identifying the path as a problem area or obstacle on a map of a mowing area. In some embodiments, the user may even define the boundaries using the separate device, for example, by drawing the boundaries or using the device as a remote control for manual operation of the mower 100. One example of an obstacle is a permanent obstacle, such as a boulder. The mower 100 may receive the identification of the problem area or obstacle from the separate device. In such cases, the mower 100 may be configured to mow only in a certain direction through the problem area in response to receiving the identified problem area, or the mower may be configured to take proactive evasive maneuvers to avoid running into the obstacle while traversing a slope and may create an exclusion zone around a permanent obstacle in response to receiving the identified obstacle.

In view of the above, it will be readily apparent that the functionality of the controller 120 may be implemented in any manner known to one skilled in the art. For instance, the memory 124 may include any volatile, non-volatile, magnetic, optical, and/or electrical media, such as a random-access memory (RAM), read-only memory (ROM), non-volatile RAM (NVRAM), electrically-erasable programmable ROM (EEPROM), flash memory, and/or any other digital media. While shown as both being incorporated into the controller 120, the memory 124 and the processor 122 could be contained in separate modules.

The processor 122 may include any one or more of a microprocessor, a controller, a digital signal processor (DSP), an application specific integrated circuit (ASIC), a field-programmable gate array (FPGA), and/or equivalent discrete or integrated logic circuitry. In some embodiments, the processor 122 may include multiple components, such as any combination of one or more microprocessors, one or more controllers, one or more DSPs, one or more ASICs, and/or one or more FPGAs, as well as other discrete or integrated logic circuitry. The functions attributed to the controller 120 and/or processor 122 herein may be embodied as software, firmware, hardware, or any combination of these. Certain functionality of the controller 120 may also be performed with Internet-connected cloud computing or other distributed computing systems operably connected to the processor 122.

In FIG. 1, schematic connections are generally shown between the controller 120 and the battery 114, wheel motor(s) 104, blade motor 112, optional boundary wire sensor 115, wireless radio 117, and GPS receiver 116. This interconnection is illustrative only as the various subsystems of the mower 100 could be connected in most any manner, e.g., directly to one another, wirelessly, via a bus architecture (e.g., controller area network (CAN) bus), or any other connection configuration that permits data and/or power to pass between the various components of the mower. Although connections with some of the sensors 130, 132, 133 are not shown, these sensors and other components of the mower 100 may be connected in a similar manner. The wireless radio 117 may communicate over a cellular or other wide area network (e.g., even over the internet), a local area network (e.g., IEEE 802.11 "Wi-Fi" radio), or a peer-to-peer (P2P) (e.g., BLUETOOTH™) network with a user interface device 119 (e.g., mobile device, such as a cellular phone, tablet, desktop, or wearable computer). In turn, the user interface device 119 may communicate with other devices over similar networks and, for example, may be used to connect the mower 100 to the internet.

The user interface device 119 may or may not be couplable to the mower 100. In some embodiments, the user interface device 119 may be used to provide user input or commands from the user to the mower 100. In some embodiments, the user interface device 119 may be used to provide an indication to the user, such as a visual presentation on a graphical user interface (e.g., screen or touchscreen).

In some embodiments, various functionality of the controller or controllers 120 described herein may be offloaded from the mower 100. For example, recorded images may be transmitted to a remote server (e.g., in the cloud) using the wireless radio 117 and processed or stored. The images stored, or other data derived from processing, may be received using the wireless radio 117 and be stored on, or further processed by, the mower 100.

Figure 2A:
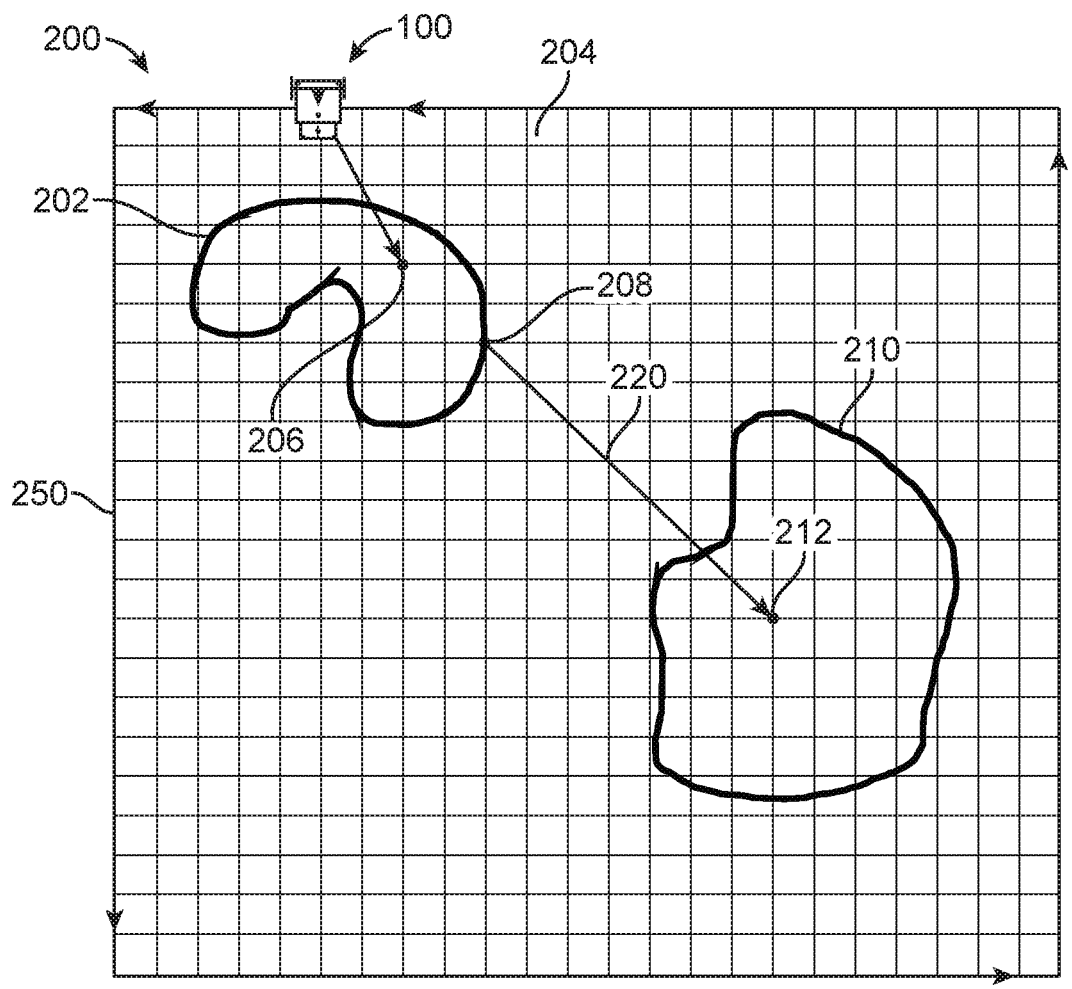
FIG. 2A is a plan view of one example of a process for covering a work region within a boundary using, for example, the autonomous grounds maintenance machine of FIG. 1.
Figure 2B:
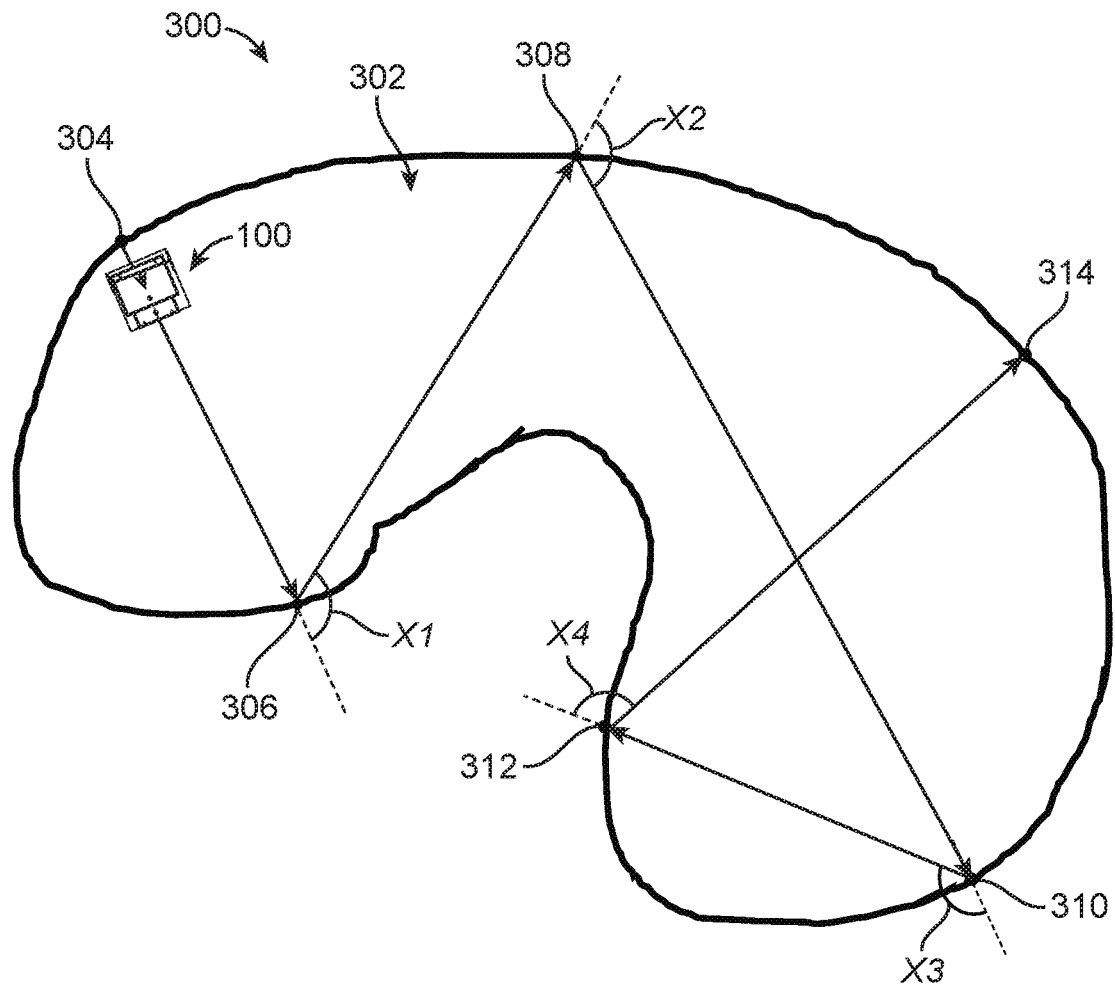
FIG. 2B is a plan view of one example of a process for covering a zone within the work region of FIG. 2A for use with, for example, the autonomous grounds maintenance machine of FIG. 1.
Figure 3:
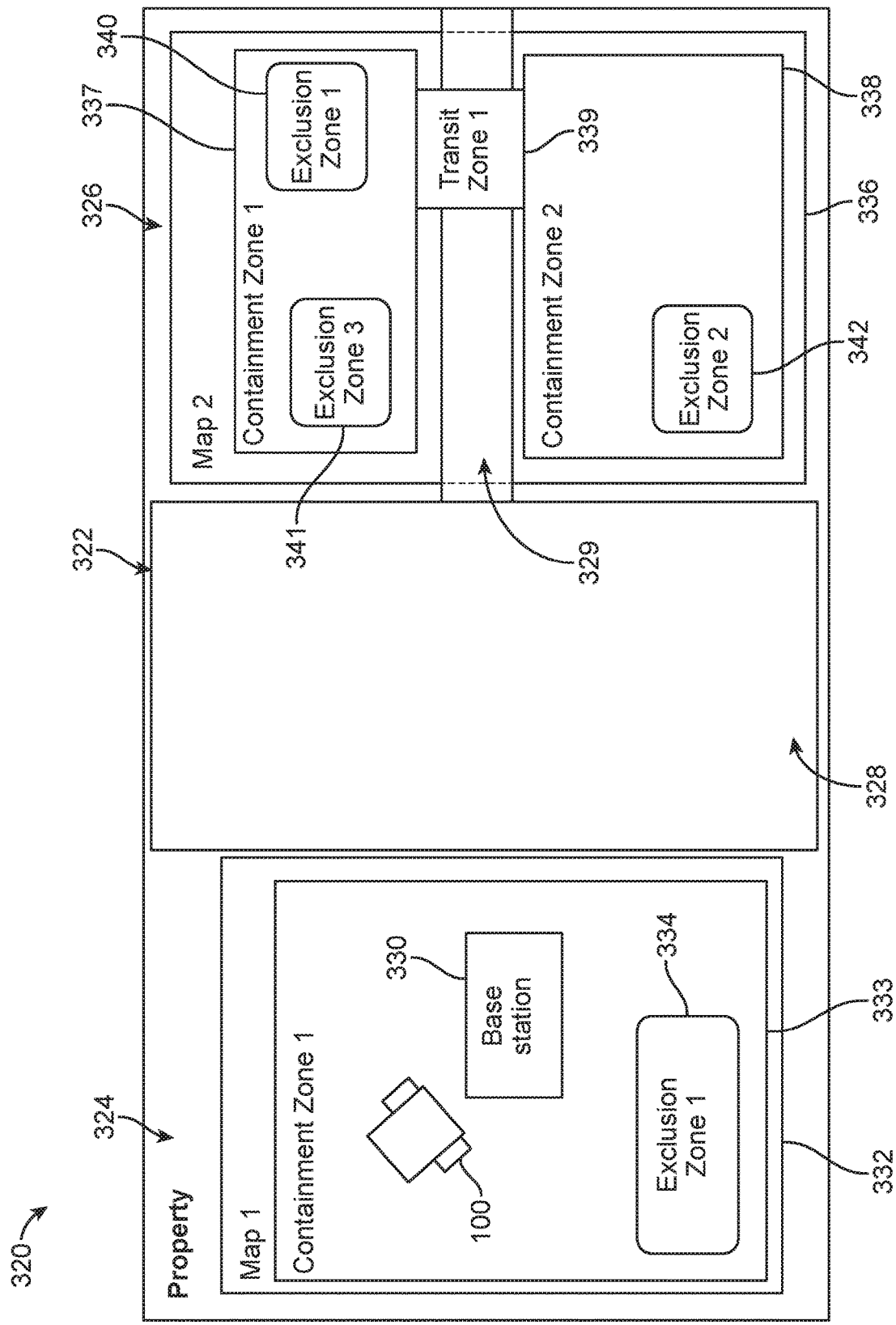
FIG. 3 is a plan view of an example scheme for a work region for use with, the autonomous grounds maintenance machine of FIG. 1.

FIG. 2A, FIG. 2B, and FIG. 3 show a work region 200 and a work region 322 either of which the mower 100 may be configured to operate according to an operating schedule, for example, to maintain the work region. The work region 200 may include one or more containment zones and the mower 100 may perform an operational task within each containment zone. In some cases, one containment zone is defined as the entire work region 200. In other cases, multiple (e.g., two or more) containment zones are defined in the work region 200.

A boundary may be defined, or determined, around the work region 200. For example, a user may provide user input that indicates the location of the boundary. The boundary may be also be described as an outer perimeter. In some embodiments, other boundaries around the containment zones 202, 210 may be defined within the boundary of the work region 200 depending on the method used to cover the work region 200. For example, the containment zones 202, 210 may be traveling containment zones or static containment zones. A user may provide user input that indicates the location of a boundary for a static containment zone.

The mower 100 may cover the work region 200 (e.g., traversed to mow the work region) using various methods. In some embodiments, the mower 100 may traverse according to random, semi-random, or planned paths within the work region 200 or within containment zones 202, 210 of the work region 200.

Various types of containment zones may be defined and used by the mower 100. Some containment zones may be described as autonomous containment zones, which the mower 100 may access independent of the user (e.g., from a base station). Other containment zones may be described as isolated containment zones, which the mower 100 may not be able to access independent of the user (e.g., the user may need to carry the mower from the base station to an area where the mower can resume autonomous operation to access the isolated containment zone).

FIG. 2A shows one example of a process for covering a work region 200 with the mower 100 using a plurality of zones 202, 210 (e.g., containment zones). The work region 200 may represent an outdoor area or maintenance area, such as a lawn. The mower 100 may be operated to travel through the work region 200 along a number of paths to sufficiently cut all the grass in the work region 200. The mower 100 may recharge as needed, for example, when transitioning between zones 202, 210. A recharging base (not shown) may be located within or along the work region 200.

A boundary may be used to define the work region 200. The boundary may be defined manually, or automatically, using a training mode of the mower 100. In addition, some of the boundary may also be defined using a fixed property boundary or other type of boundary. In some embodiments, the boundary may be defined by directing the mower 100 along the work region 200, in particular, along a desired boundary path 250 of the work region 200.

Boundaries may be defined relative to the work region 200 for different purposes. For example, a boundary may be used to define a containment zone, such as for zone 202, zone 210, or work region 200. In general, the mower 100 may be directed to travel within a boundary for a containment zone for a time period. Another boundary may be used to define an exclusion zone. An exclusion zone may represent an area of the work region 200 for the mower 100 to avoid or travel around. For example, an exclusion zone may contain an obstacle (e.g., a natural or artificial impediment), problem area (e.g., insufficient traction), or area that does not need maintenance (e.g., flower bed). Another boundary may be used to define a transit zone. A transit zone is a zone connecting two other zones, such as a path connecting different containment zones. A maintenance task may or may not be performed in the transit zone (e.g., may not mow grass in a transit zone). For example, a transit zone may include an entire driveway between two grassy parts of a lawn.

The work region 200 may be mapped. For example, the map may be developed during a teaching or training mode of the mower 100 or during subsequent mowing operations. Regardless, the map may contain information about the work region 200, for example, elevation, grade, points of interest, identified obstacles (e.g., permanent obstacles), identified stuck areas (e.g., areas the mower has gotten stuck whether due to grade or other traction conditions), or other information that may facilitate the ability of the mower 100 to traverse the work region.

The coordinate system 204 is shown for illustrative purposes only. The resolution of points used to build or store the map may be defined in a manner that provides useful information for traversing the work region 200 (e.g., on the order of feet or decimeters). For example, the resolution of points may correspond to spacing between points being less than or equal the width of the mower 100. In some cases, different functions of path planning may use different levels of resolution. For example, path planning that maps containment or exclusion zones may have the highest resolution (e.g., on the order of centimeters). In other words, the resolution of points proximate to, adjacent to, or near irregular boundaries or obstacles may have a finer granularity.

The mower 100 may start coverage of the work region 200, for example, starting at a boundary of the work region. The mower 100 may determine a first zone 202. The zone 202 may be located adjacent to a boundary of the work region 200 or, as illustrated, may be located further within the work region. In one embodiment, the zone 202 covers the entire work region 200.

In another embodiment, the zone 202 does not cover the entire work region 200. When the mower 100 is finished mowing the zone 202, the mower may start another zone (e.g., zone 210, which may be dynamic or fixed) to continue mowing.

The mower 100 may determine a starting point or starting coordinate 206 within the first zone 202. For example, the starting coordinate 206 may be selected from the highest elevational point within the zone 202 or somewhere at the edge of the zone 202. The mower 100 may rotate, if needed, to orient itself toward the starting coordinate 206 from its current position at the boundary of the work region 200. The mower 100 may propel itself toward the starting coordinate 206.

After arriving at the starting coordinate 206, the mower 100 may begin traveling through the zone 202 to cut grass within the zone. As described below, the mower 100 may use randomly-generated destination waypoints within the zone. In addition, or in the alternative, the mower 100 may use a planned pattern with planned waypoints within the zone. Such pattern mowing may use planned waypoint creation to cover the zone.

When the mower 100 arrives at a final destination waypoint 208, the mower is finished cutting grass within the current zone 202. The mower 100 may determine a next zone 210 (which may or may not be immediately adjacent to the zone 202) and a next starting point 212 within the next zone. The mower 100 may orient itself and begin traveling to the next starting point 212. The path 220 from a final destination waypoint 208 in a zone 202 or toward a next starting point 212 in a next zone 210 may be described as a "go to goal" path (e.g., which may traverse a transit zone).

Once the mower 100 arrives at the next starting point 212, the mower 100 may begin traveling through the next zone 210. The process of generating and working zones may be repeated a number of times to provide sufficient coverage of the work region 200.

In FIG. 2B, one method 300 of covering a zone 302 is shown as an overhead view illustrating a sequence of paths for taking the mower 100 through at least part of the zone. The path of the mower 100 shown may be applicable, for example, to operation of the mower 100 when a boundary defines a containment zone around zone 302 within the boundary of the work region 200 (FIG. 2A).

In the illustrated embodiment, the mower 100 travels from starting point 304 to destination waypoint 306. After reaching destination waypoint 306, the mower 100 may determine a second destination waypoint 308, rotate X1 degrees, and travel toward the second destination waypoint. This sequence of rotating and traveling may continue to reach third destination waypoint 310, fourth destination waypoint 312, and final destination waypoint 314 (e.g., using rotations X2, X3, and X4, respectively). Although only a few destination waypoints 306, 308, 310, 312, 314 are shown in this illustration, the mower 100 may travel to several more waypoints in order to sufficiently cover the zone 302. In some embodiments, the mower 100 may select the smallest angle available to rotate and orient itself toward the next destination waypoint (e.g., 90 degrees counterclockwise instead of 270 degrees clockwise).

FIG. 3 shows a scheme 320 that may be used by the mower 100 (FIGS. 1-2B) for defining zones in another example of a work region 322. As illustrated, the work region 322 includes a first area 324 and a second area 326 separated by an obstacle or impassable area 328, such as the presence of a house. A base station 330 for docking the mower 100 may be positioned in the first area 324. In some embodiments, the scheme 320 may define a navigation map for each of the different areas. In one example, the scheme 320 may define a first navigation map 332 for the first area 324 and a second navigation map 336 for the second area 326.

In the illustrated embodiment, the first navigation map 332 defines one containment zone 333 that may cover the entire first area 324. The navigation map 332 may also define an exclusion zone 334 within the containment zone 333. The second navigation map 336 may define a first containment zone 337, a second containment zone 338, and a transit zone 339 between these zones. In some embodiments, the transit zone 339 may be defined over a non-coverage area 329 of the work region 322 that does not need to be covered or mowed, such as a driveway. The first containment zone 337 and the second containment zone 338 may be separated by this non-coverage area 329. The navigation map 336 may further define a first exclusion zone 340 in the first containment zone 337, a second exclusion zone 342 in the second containment zone 338, and a third exclusion zone 341.

The mower 100 may move between containment zones autonomously or with user intervention. In one example, user intervention may be required for the mower 100 to move from the first area 324 to the second area 326. In another example, the mower 100 may use a "goal to goal" path to traverse from the first containment zone 337 to the second containment zone 338 using the transit zone 339 in the second navigational map 336.

Figure 4:
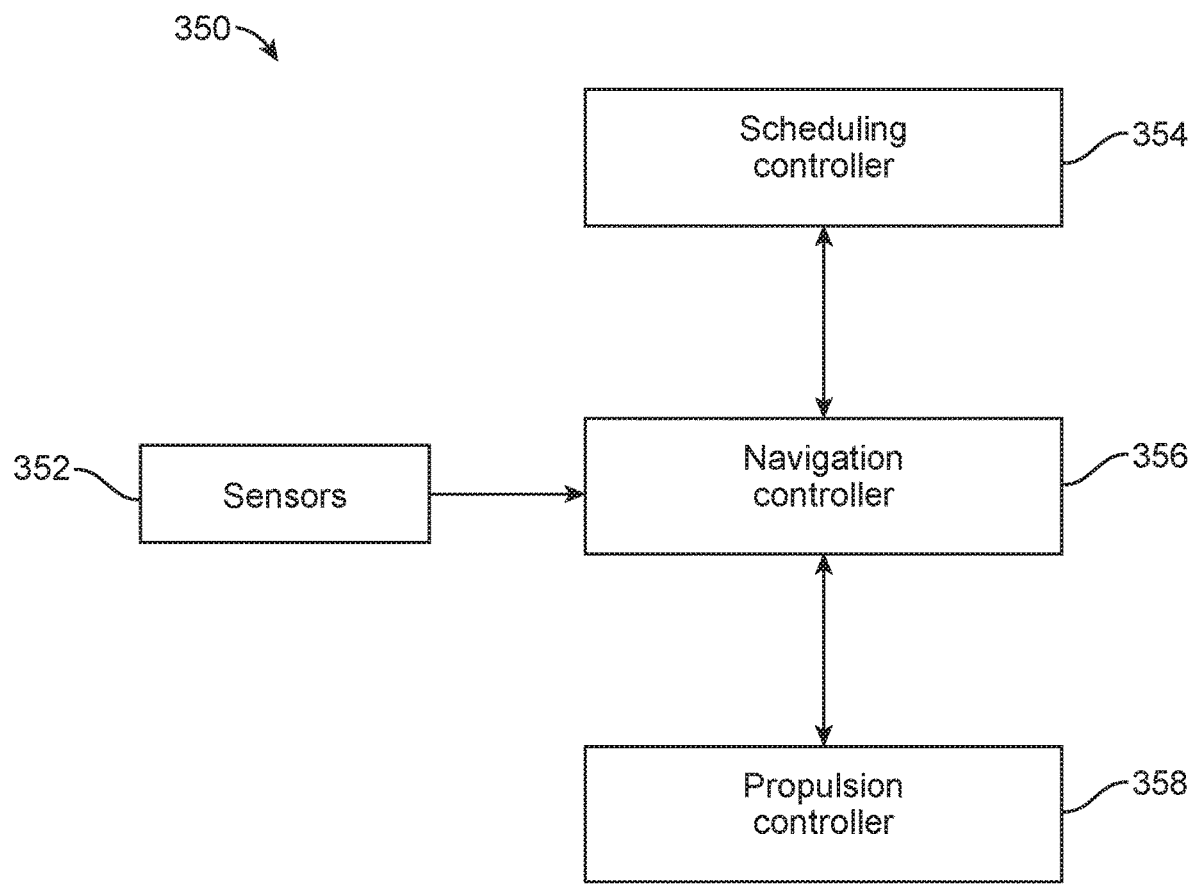
FIG. 4 is a diagram of one example of an electronic control system that may be used with, for example, the autonomous grounds maintenance machine of FIG. 1.

FIG. 4 shows a general overview of an electronic control system 350 for the mower 100 (FIGS. 1-3), which may include one or more sensors 352, a scheduling controller 354, a navigation controller 356, and a propulsion controller 358. The control system 350 may be used to command the autonomous machine to operate in the work region according to an operating schedule.

The one or more sensors 352 may be operably coupled to one or more of the controllers 354, 356, 358. The one or more sensors 352 may include vision-based sensors (e.g., part of a vision system) or non-vision-based sensors (e.g., a wheel encoder or an accelerometer). In some embodiments, the sensors 352 be operably coupled to only the navigation controller 356. the sensors 352 may not be operably coupled to the scheduling controller 354 or the propulsion controller 358, for example, when only the navigation controller 356 is responsible for providing the pose of the mower 100.

The scheduling controller 354 may generate, or determine, the operating schedule based on user input, training information, or other information related to the work region. In some embodiments, the scheduling controller 354 includes processing circuitry. The scheduling controller 354 may be configured to determine an operating schedule for the work region based on the available times for operation and a total operation time. The scheduling controller 354 may be operably coupled to the navigation controller 356 or propulsion controller 358 to provide information or commands related to when the autonomous machine should be operated.

As used herein, the term "total operation time" refers to the total amount of time estimated, predicted, or determined that the autonomous machine will use to complete a set of one or more operational tasks. In some embodiments, the total operation time may refer to the amount of time needed to complete all operational tasks that are scheduled to be completed during a particular time period. Any suitable time period for a particular work region may be used. The time period may be on the order of days or weeks (e.g., one, two, three, or more). For example, if the autonomous machine is scheduled to complete task A and task B within one week, and the time determined to complete task A is 1 hour and the time determined to complete task B is 2 hours, the total operation time will be equal to 3 hours. The total operation time may be determined by the scheduling controller 354 based on training, user input, environmental information, or other information (e.g., default settings).

The navigation controller 356 may be used to determine the path that the autonomous machine will traverse during operation. The navigation controller 356 may be operably coupled to the propulsion controller 358 to provide information or commands related to where the autonomous machine should go.

One or more of the components, such as controllers, modules, sensors, or even systems, described herein may include a processor, such as a central processing unit (CPU), computer, logic array, or other device capable of directing data coming into or out of autonomous machine or user interface device. The controller may include one or more computing devices having memory, processing, and communication hardware. The controller may include circuitry used to couple various components of the controller together or with other components operably coupled to the controller. The functions of the controller may be performed by hardware and/or as computer instructions on a non-transient computer readable storage medium.

In one or more embodiments, the exemplary systems, methods, and interfaces may be implemented using one or more computer programs using a computing apparatus, which may include one or more processors and/or memory. Program code and/or logic described herein may be applied to input data/information to perform functionality described herein and generate desired output data/information. The output data/information may be applied as an input to one or more other devices and/or methods as described herein or as would be applied in a known fashion. In view of the above, it will be readily apparent that the controller functionality as described herein may be implemented in any manner known to one skilled in the art.

Various controllers of the control system 350 may be implemented in one or more systems of the mower 100. For example, the sensors 352 may be implemented in a vision system, the scheduling controller 354 and the navigation controller 356 may be implemented in a navigation system, and the propulsion controller 358 may be implemented in a propulsion system.

Figure 5:
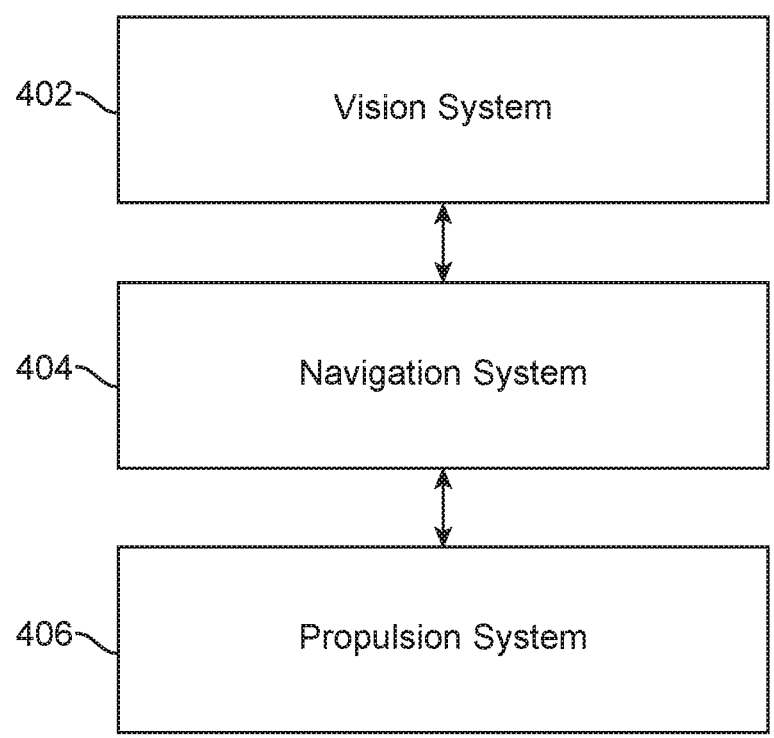
FIG. 5 is a diagram of one example of systems that may be used with, for example, the autonomous grounds maintenance machine of FIG. 1.

FIG. 5 shows a general overview of various systems of the mower 100 (FIGS. 1-3) including a vision system 402, a navigation system 404, and a propulsion system 406. The vision system 402 may be operably coupled to the navigation system 404, and the navigation system 404 may be operably coupled to the propulsion system 406.

Sensors of the navigation system 404 may be used to record non-vision-based data during a training mode while the vision system 402 records images, such as training images. Although the mower 100 may be directed manually by a user, in some embodiments, the navigation system 404 may autonomously direct the machine during the training mode. The vision system 402 may include one or more cameras to record, or capture, images. In some embodiments, a controller of the vision system 402 may provide position and/or orientation data to the navigation system 404 based on the recorded images, which may be used to facilitate navigation of the mower 100. For example, the vision system 402 may provide an estimated position and/or orientation of the mower 100 to the navigation system 404 based on vision-based sensor data.

In some embodiments, the navigation system 404 may primarily use a position and/or orientation based on non-vision-based sensor data for navigation. For example, non-vision-based sensor data may be based on an output from an inertial measurement unit or wheel encoder. During a training mode or an offline mode, for example, a controller of the navigation system 404 may determine a boundary using non-vision-based sensor data, and the vision-based data, for subsequent navigation of the autonomous machine in the work region. During an online mode, for example, a controller of the navigation system 404 may determine a pose based on vision-based pose data, non-vision-based pose data, or both. In some embodiments, a pose may be determined based on non-vision-based sensor data and update the pose based on the vision-based pose data. The navigation system 404 may compare the vision-based position and/or orientation to the non-vision-based position and/or orientation to correct for errors and update the position, which may be described as sensor fusion. In some embodiments, sensor data other than vision-based sensor data may be used to correct for errors and update the position, such as GPS data.

A controller of the navigation system 404 may command the propulsion system 406 based on an updated pose. For example, a corrected or updated position or orientation may be used by the navigation system 404 to provide propulsion commands to a propulsion system 406. The propulsion system 406 (e.g., propulsion hardware) may be defined to include, for example, motors 112, 104 and wheels 106, 108 (FIG. 1) or any related drivers (e.g., motor controllers or microchips).

Figure 6:
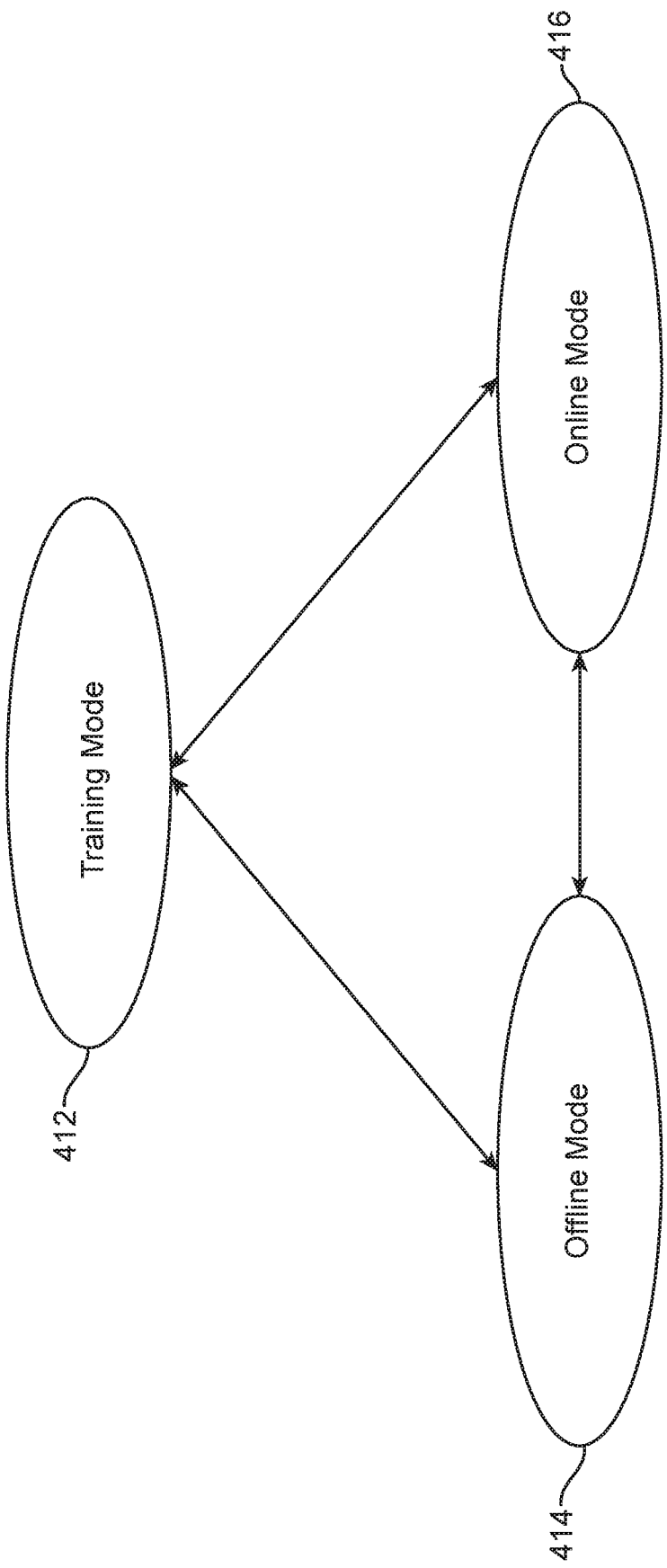
FIG. 6 is a diagram of one example of modes that may be used with, for example, the autonomous grounds maintenance machine of FIG. 1.

In FIG. 6, schematic modes or states are shown that may be used by the mower 100 (FIGS. 1-3). As illustrated, the mower 100 may be configured in a training mode 412, an offline mode 414, and an online mode 416. The mower 100 may switch between the various modes, which may also be described as configurations or states. Some functionality of the mower 100 may be used during certain modes, for example, to optimally utilize computing resources.

As used herein, the term "training mode" refers to a routine or state of an autonomous machine (e.g., mower 100) for recording data for later or subsequent navigation of the machine in a work region. During the training mode, the machine may traverse the work region without performing maintenance functions. For example, a training mode of an autonomous lawn mower may include directing the mower to traverse along some or all of the work region (e.g., along a desired boundary path), or a zone within the work region (e.g., containment zone or exclusion zone), and may or may not use a mowing blade in the zone or work region. In some cases, the mower may be manually directed using a handle (e.g., handle 90 of FIG. 1) in the training mode. In other cases, the mower may be autonomously directed by the navigation system.

As used herein, the term "offline mode" refers to a routine or state of an autonomous machine (e.g., mower 100) for charging a portable power supply or processing data recorded during an online mode or training mode. For example, an offline mode of an autonomous lawn mower may include docking the mower in a charging station overnight and processing data recorded during a training mode or an online mode.

As used herein, the terms "online mode" and "operating mode" each refer to a routine or state of an autonomous machine (e.g., mower 100) for operating in a work region, which may include traversing the work region and performing maintenance functions using a maintenance implement. For example, an online mode of an autonomous lawn mower may include directing the mower to cover or traverse the work region, or a zone within the work region, and using a mowing blade in the zone or work region to cut grass.

In some embodiments, the mower 100 may interact with the user interface device 119 (FIG. 1) during the offline mode 414, or any of the other modes, to configure an operating schedule for autonomous operation of the mower 100. For example, the user interface device 119 may accept user input or display information to the user.

Figure 7:
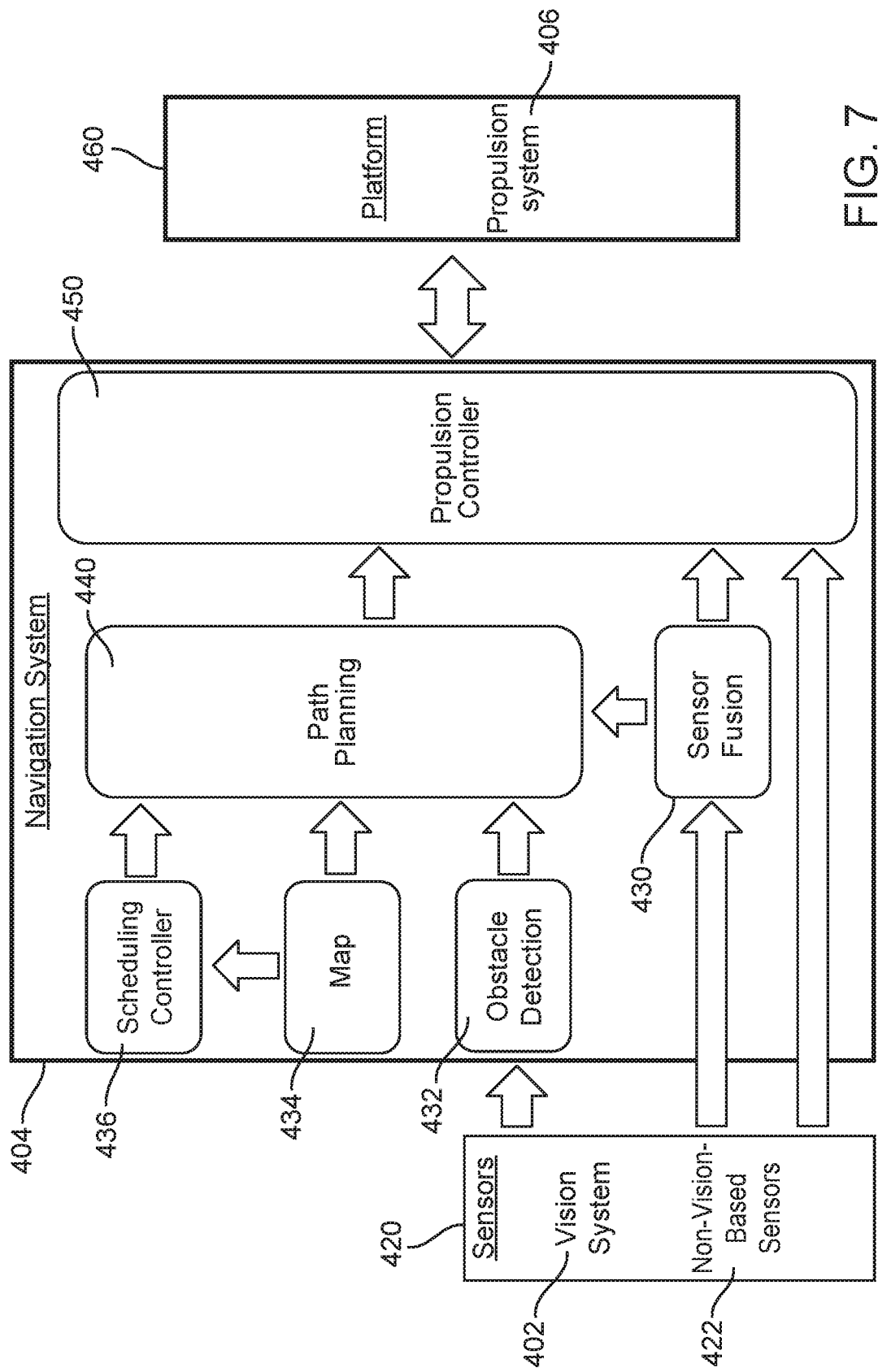
FIG. 7 is a diagram of one example of systems including a scheduling controller that may be used with, for example, the autonomous grounds maintenance machine of FIG. 1.

FIG. 7 shows one example for implementing the navigation system 404. Sensors 420 may be operably coupled to the navigation system 404 to provide various sensor data, for example, to be used during an online mode. The vision system 402 (e.g., including a vision controller) and the navigation system 404 (e.g., including a navigation controller) may each include its own processor and memory. Various modules of the navigation system 404 are shown to implement various functionality to navigate the autonomous machine. The navigation system 404 may be operably coupled to a platform 460 to control physical actions of the autonomous machine.

The sensors 420 may include sensors associated with the navigation system 404, vision system 402, or both. The navigation system 404 and the vision system 402 may both include the same type of sensors. For example, the systems 402, 404 may each include an IMU.

As used herein, the term "platform" refers to structure of the mower (e.g., mower 100 of FIGS. 1-3) that support the sensors 420 and the navigation system 404. For example, the platform 460 may include a propulsion system 406 (e.g., motors and wheels), the housing 102 (FIG. 1), the cutting motor 112 (FIG. 1), and the maintenance implement (e.g., blade 110 in FIG. 1), among other possible components. In some embodiments, the entire autonomous machine may be described as being on the platform 460.

In the illustrated embodiment, the sensors 420 include the vision system 402 and non-vision-based sensors 422. Sensor data from the sensors 420 may be provided to a sensor fusion module 430. In particular, the vision system 402 may provide an estimated vision-based pose containing position and orientation parameters to the sensor fusion module 430. Non-vision-based sensors 422 may include, for example, an inertial measurement unit (IMU) and/or a wheel encoder. The sensor fusion module 430 may provide an estimated pose of the autonomous machine based on sensor data.

A path planning module 440 may receive the estimated pose of the autonomous machine from the sensor fusion module 430 and use the estimated pose for autonomous navigation. Other information, or data, may be received by the path planning module 440 to facilitate navigation. An obstacle detection module 432 may provide information regarding the presence of an obstacle in the work region and the position of the obstacle based on sensor data from the sensors 420. The navigation system 404 may also define and update a map 434 of at least the work region. The map 434 may define or be updated to define one or more of containment zones, exclusion zones, transit zones, and mowing history, each of which may be provided to the path planning module 440 to facilitate navigation. Mowing history may also be provided to a scheduling controller 436, or scheduling controller. Also, the path planning module 440 may perform both global path planning (e.g., determining zones within the work region) and local path planning (e.g., determining waypoints or starting points).

As illustrated, the scheduling controller 436 is part of the navigation system 404. The scheduling controller 436 may be used to manage the operating schedule for the autonomous machine. In particular, the scheduling controller 436 may determine the operating schedule based on user input or information gathered during training. The scheduling controller 436 may be operably coupled to a propulsion controller 450 through the path planning module 440. The scheduling controller 436 may be used to command the autonomous machine to operate in the work region according to the operating schedule, for example, by informing the path planning module 440 of when to perform certain operational tasks according to the operating schedule.

The propulsion controller 450 may receive data from the path planning module 440, the sensor fusion module 430, and the sensors 420, which may be used by the propulsion controller 450 to provide propulsion commands to the propulsion system 406. The path planning module 440 may provide one or more waypoints or starting points to the propulsion controller 450, which may be used to traverse the some or all the work region. The sensor fusion module 430 may be used to provide rate or speed data, accelerations, positions, and orientations of the autonomous machine to the propulsion controller 450. The propulsion controller 450 may also determine whether the autonomous machine is traversing the path determined by the path planning module 440 and may facilitate correcting the path of the machine accordingly.

Other information, or data, related to the maintenance functionality of the autonomous machine may be provided to the propulsion controller 450 to control a maintenance implement, such as a cutting blade for mowing. For example, a motor drive current for the cutting blade motor may be provided to the propulsion controller 450. The propulsion controller 450 may also provide maintenance commands, for example, to control a maintenance implement on the platform 460.

Figure 8:
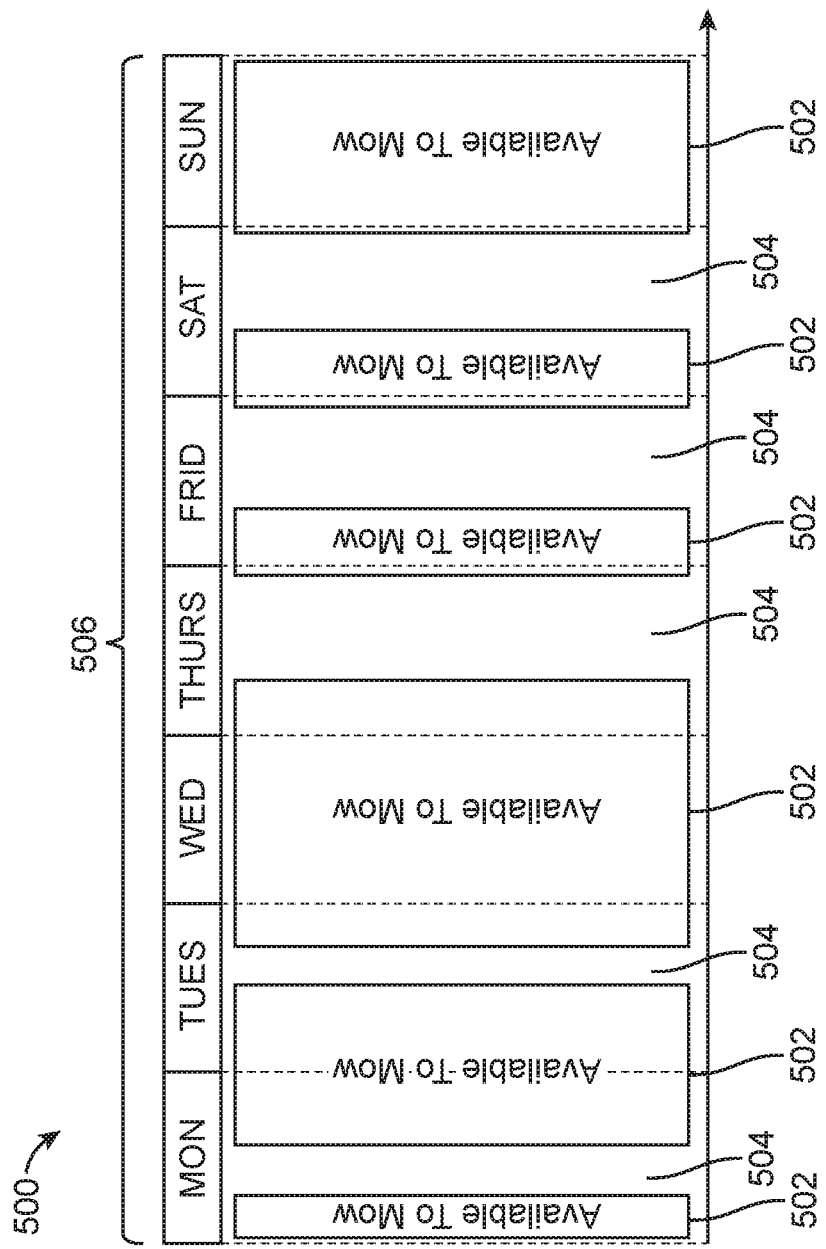
FIG. 8 is a diagram of one example of an availability schedule that may be used with, for example, the autonomous grounds maintenance machine of FIG. 1.

FIG. 8 shows one example of available times for operation in the form of an availability schedule 500 including one or more windows of availability 502 over a period of time or time period 506. The availability schedule 500 may be used to determine the operating schedule for the autonomous machine. As illustrated, the time period 506 is equal to one week from Monday through Sunday. However, any suitable time period may be used, for example, two weeks or one month.

In general, availability or available times for operation (e.g., online mode) of the autonomous machine may be determined based on receiving available times (e.g., windows of availability 502) or unavailable times (e.g., windows of unavailability 504) for the particular time period 506. The autonomous machine may check those times to determine available times in the time period 506.

A user may provide user input, for example, using the user interface device 119 (FIG. 1) that indicates available or unavailable times for when the autonomous machine is allowed to operate to perform operational tasks. In general, user input may indicate various parameters that may be used to determine the availability schedule 500. In some embodiments, user input may be indicative of one or more windows of availability, one or more windows of unavailability, or any combination of one or more of these.

Figure 9:
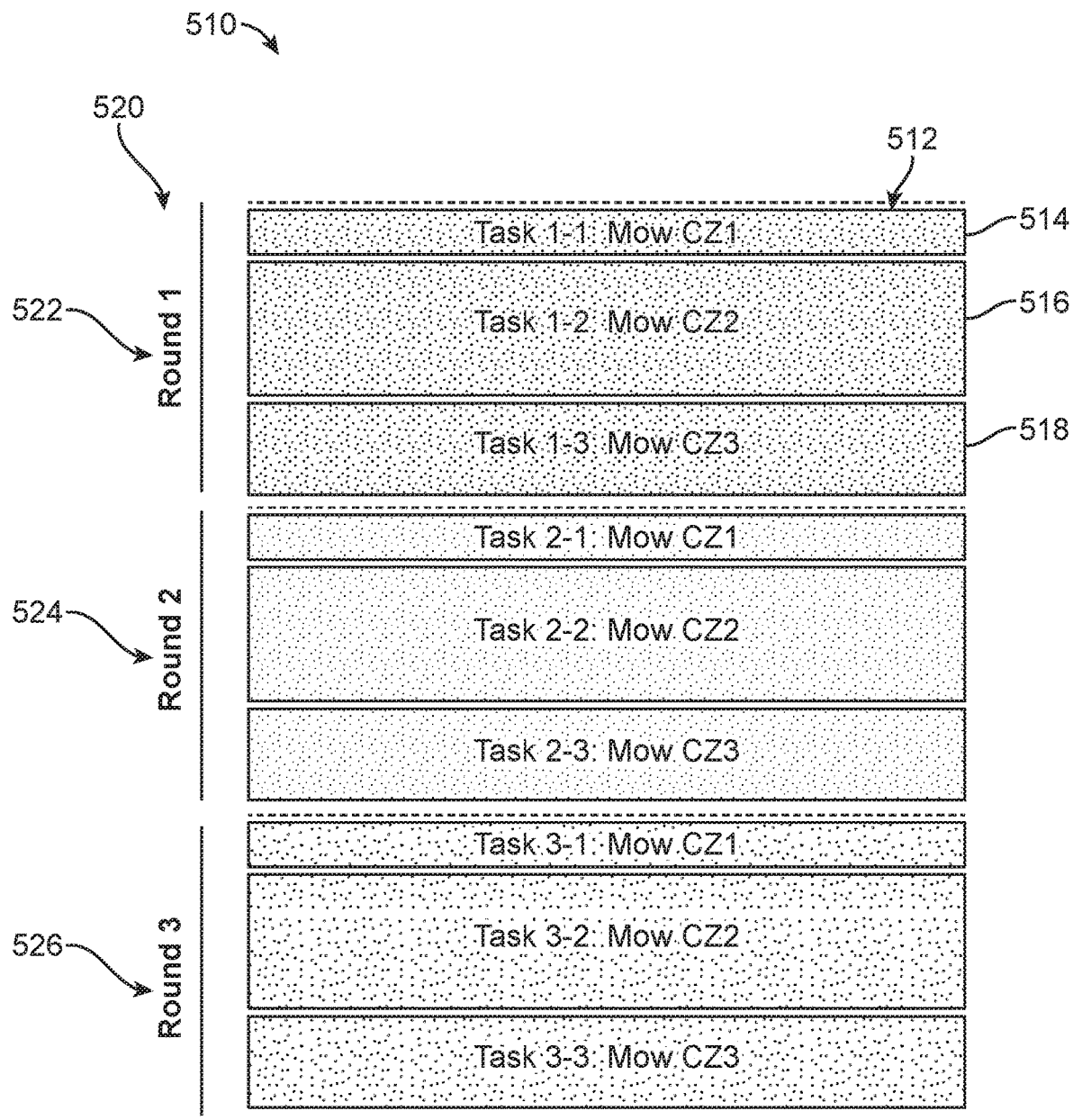
FIG. 9 is a diagram of one example of a task schedule that may be used with, for example, the autonomous grounds maintenance machine of FIG. 1.

FIG. 9 shows a task schedule 510 including a plurality of operational tasks 512 arranged in, grouped in, or assigned to a plurality of rounds 520. Each round 520 may include the performance of one or more operational tasks 512. Each round 520 may be described as a time window. When an operational task 512 is assigned to a round 520, the operational tasks 512 is scheduled to be performed during that round 520. In general, the number of rounds 520 may be selected based on the number of times a particular work region should be mowed within one time period. As illustrated, the task schedule 510 has three rounds 520.

The task schedule 510 may be used to determine the operating schedule for the autonomous machine. As illustrated, each round 520 is assigned three operational tasks 512. Each round 520 may include the same number of operational tasks 512, and the order of distinct operational tasks in each round may be the same.

In the illustrated embodiment, a first round 522 includes a first operational task 514 to mow containment zone 1 (CZ1), a second operational task 516 to mow containment zone 2 (CZ2), and a third operational task 518 to mow containment zone 3 (CZ3). A second round 524 includes the same set of tasks to mow CZ1, CZ2, and CZ3. A third round 526 also includes the same set of tasks to mow CZ1, CZ2, and CZ3. In total, nine operational tasks 512 are performed over three rounds 520.

Each of the rounds 520 may have assigned a group of one, two, or more of the operational tasks 512. In some embodiments, each round 520 may include all the operational tasks needed to cover all the desired maintenance areas of the work region (e.g., the entire work region minus exclusion zones). For example, each containment zone may only comprise a portion of the work region. In the illustrated embodiment, coverage of CZ1, CZ2, and CZ3 may cover all the desired maintenance areas of the work region. In general, in some embodiments, the completion of each round 520 may cover all the desired maintenance areas of the work region.

The number of rounds 520 and operational tasks 512 included in the task schedule 510 may be based on desired maintenance level for the work region. The desired maintenance level for the work region may be indicated by total operating time. A higher the total operating time may result in including more rounds 520 in the task schedule 510, and vice versa.

The number of rounds 520 and operational tasks 512 included in the task schedule 510 may be a design choice. In some embodiments, the number of rounds 520 in the task schedule 510 may be selected or computed as a design choice, and the number of operational tasks 512 per round may be selected or computed as a design choice. The time period may be divided into any number of rounds 520. In some embodiments, each round 520 may correspond to a single coverage of all the containment zones.

Figure 10:
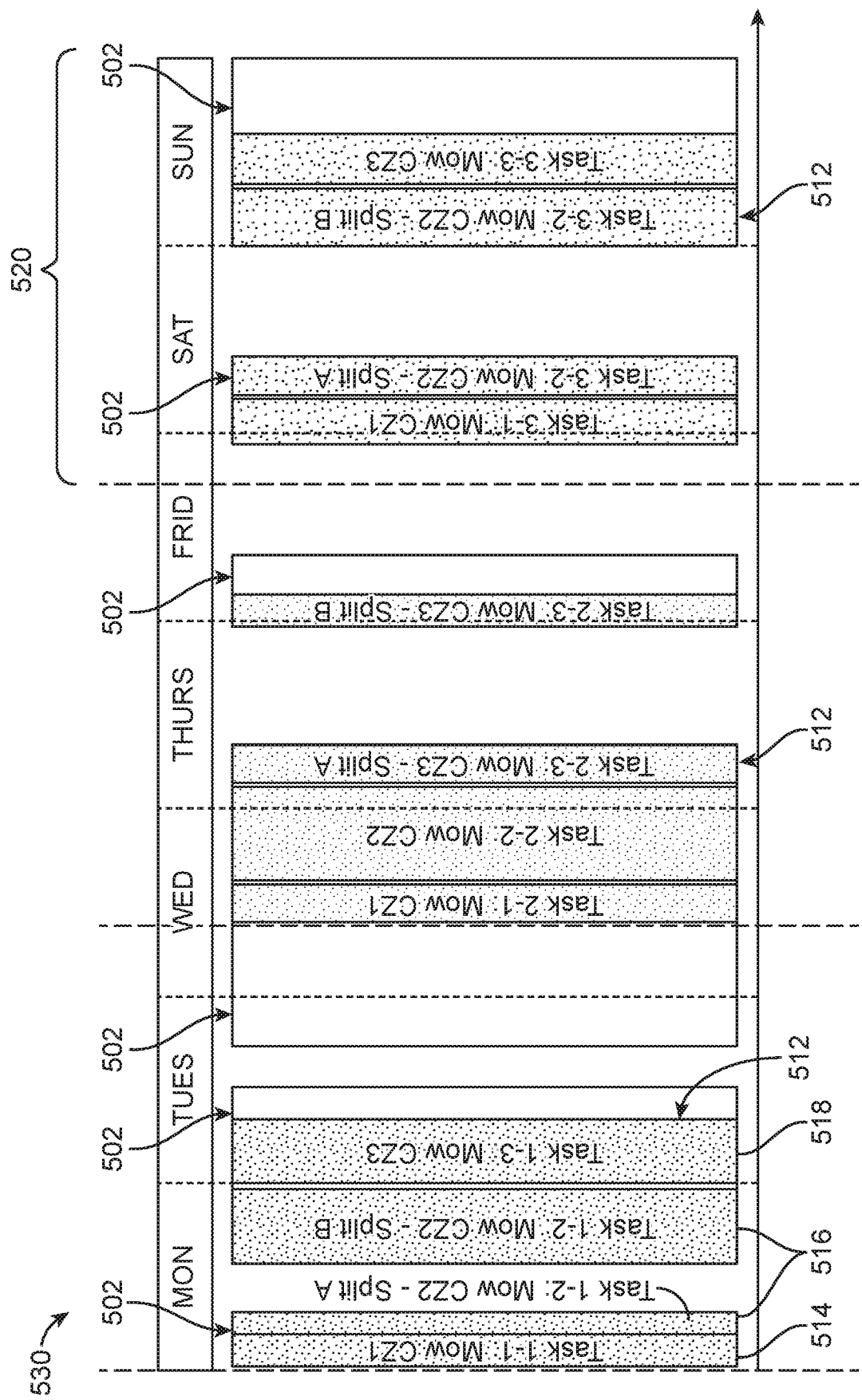
FIG. 10 is a diagram of one example of an operating schedule that may be used with, for example, the autonomous grounds maintenance machine of FIG. 1.

As can be seen in FIG. 10, the one or more operational tasks 512 included in the task schedule 510 (FIG. 9) are assigned to one or more windows of availability 502. In some embodiments, the assignment of operational tasks 512 to windows of availability 502 may be based on user input. For example, a user may limit a particular operational task 512 (e.g., mowing the front yard) to only certain windows of availability 502 (e.g., only morning windows of availability). In some other embodiments, the user may not restrict the assignment of operational tasks 512, and the operational tasks may be assigned automatically to any window of availability 502. The rounds 520 may be evenly or substantially evenly distributed throughout the time period (e.g., week, month, etc). For example, the start for each round 520 may be spaced such that each represents an equal or substantially equal amount of overall time or available time.

In the illustrated example, the operational tasks 512 associated with the first round 520 are assigned to the first and second windows of availability 502 in the time period. The start of the second round 520 is scheduled to start part way into the third window of availability 502. The operational tasks 512 associated with the second round 520 are assigned to the third and fourth windows of availability 502. The start of the third round 520 is scheduled to start between the fourth and fifth windows of availability 502. The operational tasks 512 associated with the third round 520 are assigned to the fifth and sixth windows of availability 502.

In some embodiments, one or more operational tasks 512 are split or divided between two or more windows of availability 502 or rounds 520. In the illustrated embodiment, the operational task 516 is split between the first and second windows of availability 502. Although not shown, more than one operational task 512 in a round may also be split between two or more windows of availability 502 in one or more round 520.

Figure 11:
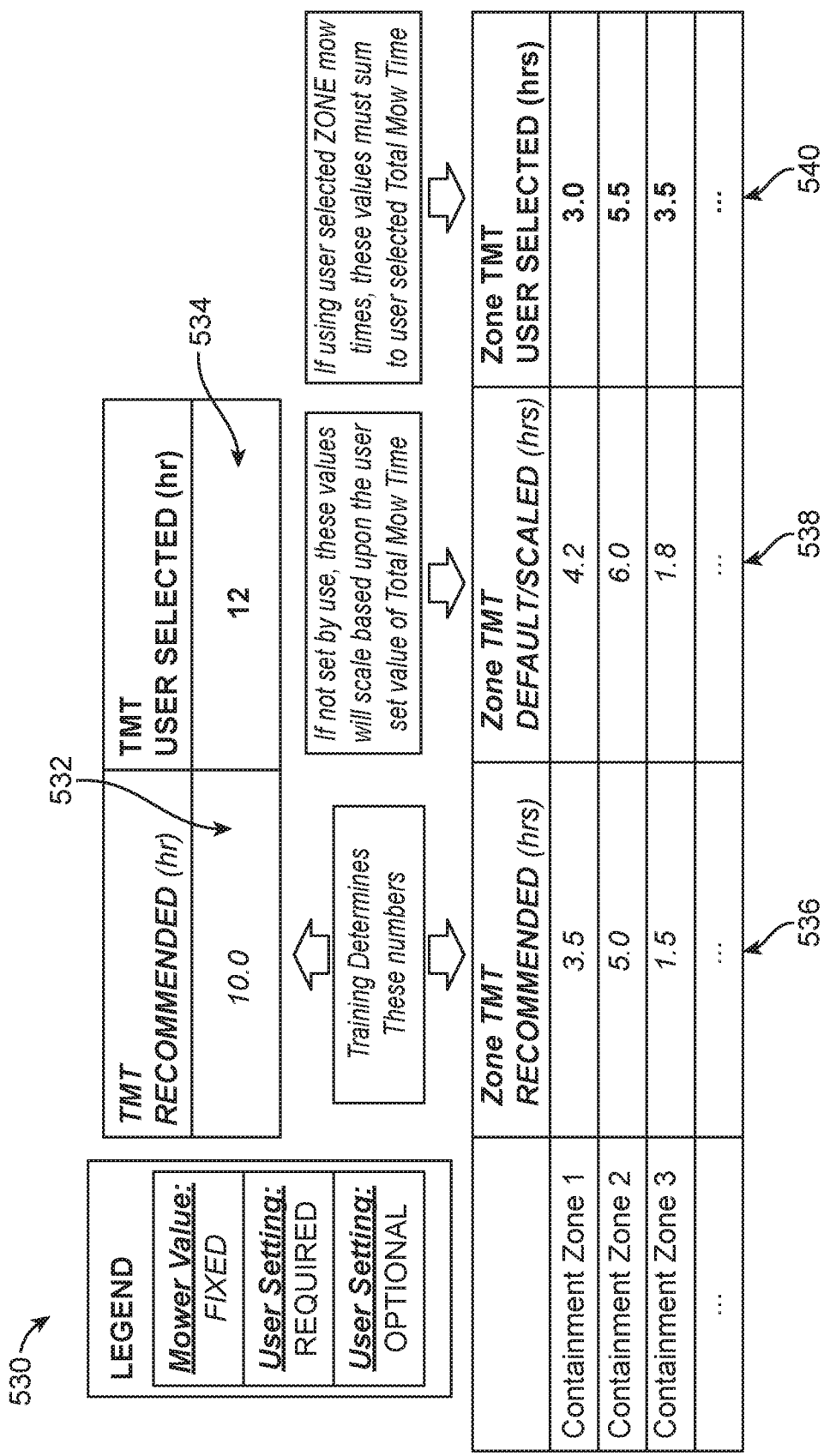
FIG. 11 is a diagram of one example of a scheme for determining operation times that may be used with, for example, the autonomous grounds maintenance machine of FIG. 1.

FIG. 11 shows a scheme 530 for determining operation times of the autonomous machine based on a total operation time over a time period, which may be implemented, for example, using a controller of the autonomous machine or the user interface device. A baseline or recommended total operation time 532 may be determined that covers all desired areas of the work region one or more times in a time period. The recommended total operation time 532 may be determined, for example, based on information obtained during a training mode. In some embodiments, the recommended total operation time 532 may be machine-determined, for example, by the scheduling controller of the autonomous machine.

In some embodiments, training of the autonomous machine may capture environmental inputs indicative of location, season, grass type, or growth rate of grass. A frequency or total operation time of the rounds in the operating schedule may be determined based on growth rate of the grass to keep the work region maintained. The current season may be used as an input in determining the growth rate of the grass. The location may be used to determine the current season and weather patterns (e.g., precipitation or drought). Training of the area may be used to determine how long it will take to cut the area (e.g., complete one round) and, based on the training, how many times per week to cover that area to ensure the area is maintained.

The user may provide user input indicative of a desired total operation time 534, which may be used to determine the total operation time used by the scheduling controller of the autonomous machine to determine the operating schedule. The desired total operation time 534 may be greater than, less than, or the same as the recommended total operation time 532. For example, the user may decide that after-cut quality of the work region needs to be increased and provide an input indicative of a desired total operation time 534 higher than the recommended total operation time 532, or the user may decide that saving power is important and provide an input indicative of a desired total operation time that is lower than the recommended total operation time.

The user input may indicate the desired total operation time 534 in various ways, for example, by indicating the desired total operation time itself, a modification to the recommended operation time 536 for one or more operational tasks, or both. A modification to the recommended operation time 536 may modify frequency, duration, or both of one or more operational tasks in the operating schedule. In some embodiments, the user input may indicate no modification or indicate a desired total operation time that equals the recommended total operation time 532 (e.g., no change).

The user input may be received by the scheduling controller of the autonomous machine through a user interface element. In some embodiments, the user interface element may include, for example, a graphical knob shown on the user interface device or a physical knob on the autonomous machine. The user may manipulate the user interface element to increase or decrease the recommended total operation time 532 to a different value. In some examples, the user input may indicate that the recommended total operation time 532 of 10 hours should be increased by +20% or by +2 hours to a desired total operation time 534 of 12 hours. When user input is provided, the operating schedule may be determined based on the recommended total operation time 532 and the user input indicating the recommended total operation time 532.

The recommended total operation time 532 may be divided into recommended operation times 536 for the containment zones. The operating schedule may be determined based on the recommended operation times 536. When user input indicating a desired total operation time is provided, each recommended operation time 536 may be scaled accordingly (e.g., proportionally) to provide a modified operation time 538 based on the user input. Modified operation times 538 for the containment zones may add up to the desired total operation time 534.

In some embodiments, user input may indicate one or more selected operation times 540 for one or more containment zones. When user input indicating a selected operation time is provided, one or more recommended operation times 536 may be replaced by one or more selected operation times 540 based on the user input. The selected operation times 540 may add up to the desired total operation time 534. In some embodiments, the selected operation times 540 may be required to add up to the desired total operation time 534, which may be the same or different than the recommended total operation time 532. In other embodiments, the desired total operation time 534 may be calculated as a sum of all selected operation times 540. Both the modified operation time 538 and the selected operation time 540 may be described as user-based operation times for the containment zones.

In some cases, the user input may indicate a desired total operation time 534 that exceeds the total available time set by the user as windows of availability for the time period. The autonomous machine may provide an indication, directly or through a separate user interface device, of the conflict between the desired total operation time 534 and the availability. The indication may include the difference in time needed in the windows of availability to achieve the desired total operation time 534, and the user may be able to adjust the desired total operation time or the windows of availability accordingly. For example, the total availability may have been five hours, but the user input may indicate a desired total operation time 534 of eight hours. The user may be provided with feedback that three more hours of availability are needed to achieve the desired total operation time 534.

In general, to determine the operating schedule, each containment zone may be associated with either a recommended operation time 536, a modified operation time 538, or a selected operation time 540. The containment zones may be each associated with the same type or different types of operation times (e.g., the user may select an operation time 540 for one containment zone and the recommended operation time 536 may be used for the other containment zones).

Some or all of the scheme 530 may be visually presented to the user, for example, to accept the respective user input. In some embodiments, the scheme 530 may be configured to accept user inputs associated with the desired total operation time 534, one or more selected operation times 540, or any combination of these. In other embodiments, the scheme 530 may be configured to not accept any user inputs. User inputs may be required or optional. In the illustrated embodiment, the desired total operation time 534 is configured as a required user input, whereas the selected operation times 540 are configured as optional user inputs. In other embodiments, the user may not need to enter a desired total operation time 534 and a recommended total operation time 532 may be used.

Figure 12:
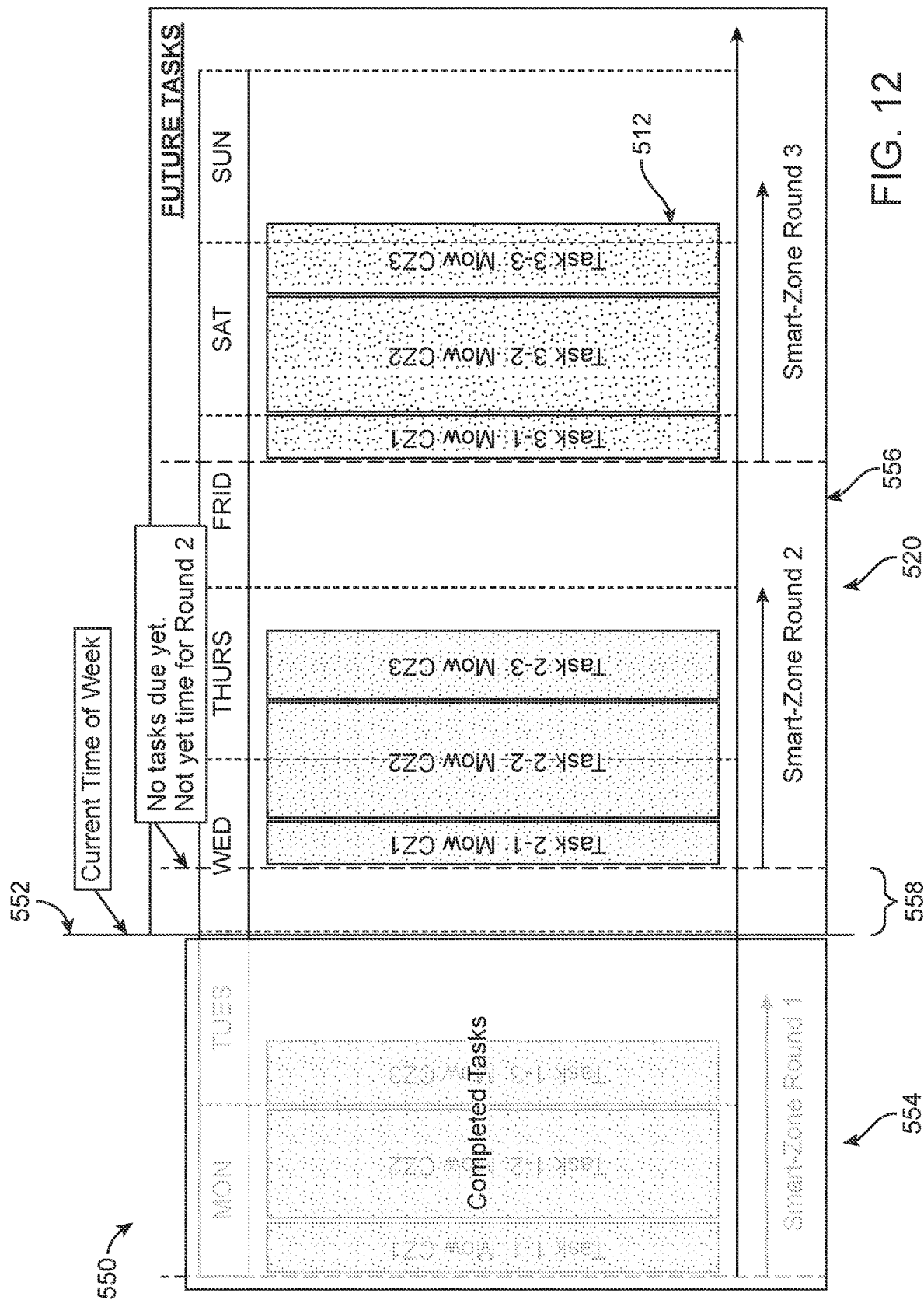
FIGS. 12-14 are diagrams of various examples of visual presentations of operation schedule progress that may be used with, for example, the autonomous grounds maintenance machine of FIG. 1.
Figure 13:
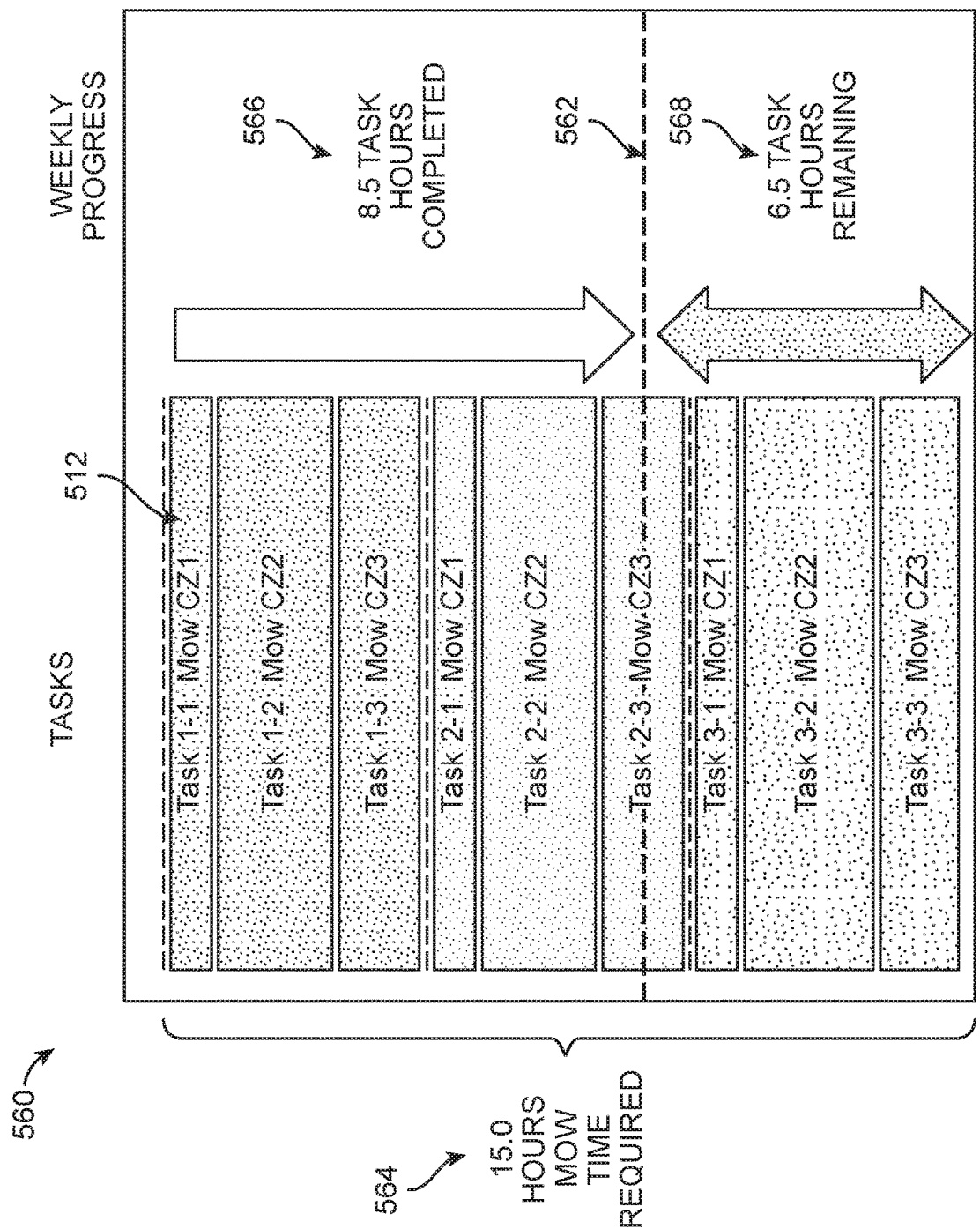
Figure 14:
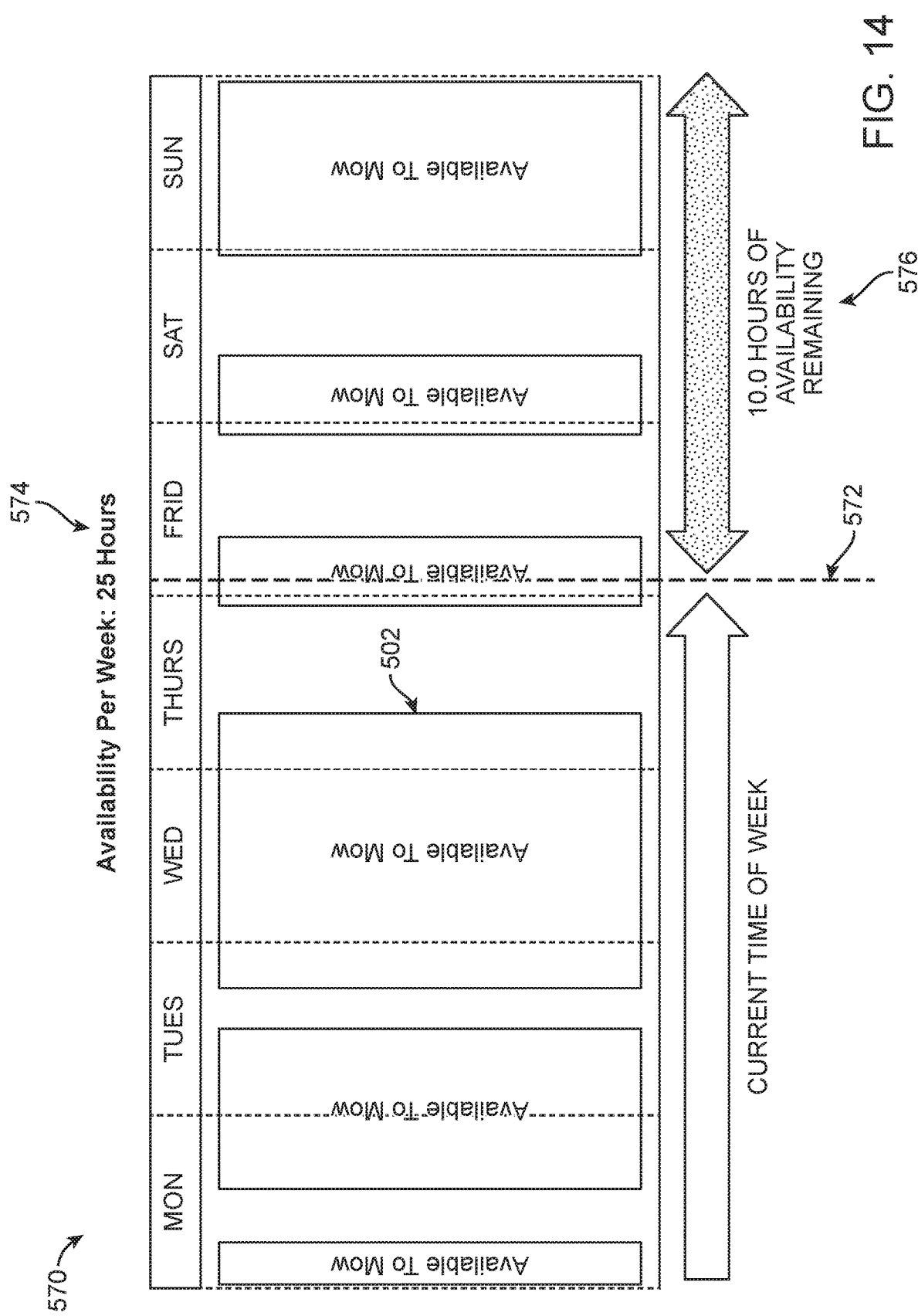

The status of the operating schedule may be visually presented to the user, for example, as shown in FIG. 12, 13, or 14. In some embodiments, operating schedule progress may be shown on the user interface device, the autonomous machine, or both.

FIG. 12 shows one example of a visual presentation of operating schedule progress 550 over a time period. As illustrated, the operational tasks 512 assigned to the rounds 520 may be shown on a timeline relative to a visual progress indicator 552 (e.g., progress line or bar). The area 554 to the left of the progress indicator 552 includes operational tasks 512 and any rounds 520 that have been completed. The area 556 to the right of the progress indicator 552 includes operational tasks 512 that have not been completed.

The visual presentation of operating schedule progress 550 may show which operational tasks 512 or rounds 520 are completed, incomplete, or not yet started. For example, as shown, the operational tasks 512 assigned to the first round 520 have been completed and two rounds 520 have not yet started.

The user may also be shown that the autonomous machine is waiting until the start of the next round 520 (e.g., no operational tasks are currently due). As illustrated, the autonomous machine may have free, or extra, time for a time period 558 before starting the second round 520, for example, because starts of the rounds 520 are spaced throughout the time period (e.g., one week). The autonomous machine may use this time, for example, to return to the base station for charging.

FIG. 13 shows another example of a visual presentation of operating schedule progress 560 over a time period. As illustrated, the operational tasks 512 may be shown on a timeline relative to a progress indicator 562 (e.g., progress line or bar). In addition, the total operation time 564 may be shown with a time-based indication of completed tasks 566 (e.g., hours of the operating schedule completed shown above the progress indicator 562) and a time-based indication of uncompleted tasks 568 (e.g., hours remaining in the operating schedule shown below the progress indicator).

FIG. 14 shows another example of a visual presentation of operating schedule progress 570 over a time period. As illustrated, the windows of availability 502 for the time period may be shown on a timeline relative to a progress indicator 572 (e.g., progress line or bar). In addition, the total availability 574 for maintenance operation may be shown with a time-based indication of total availability remaining 576 (e.g., to the right of the progress indicator 572).

Figure 15A:
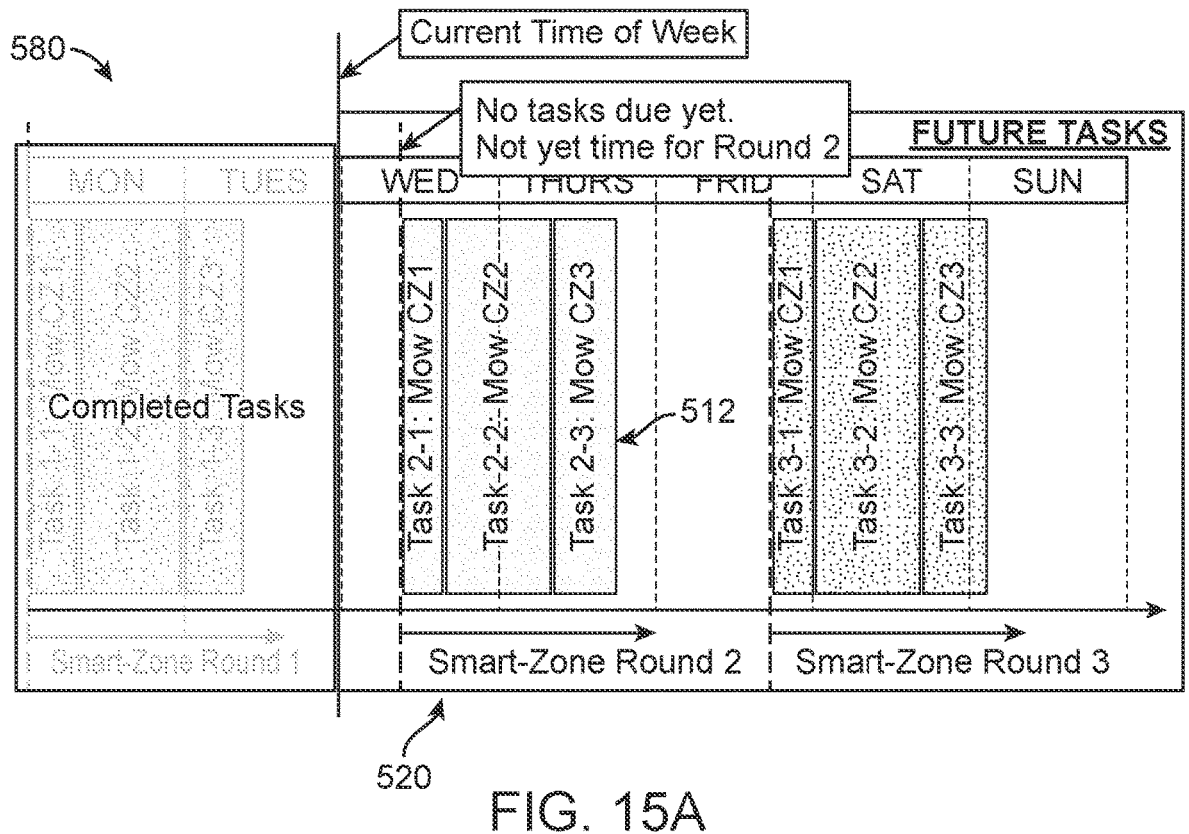
FIGS. 15A-B are diagrams that show one example of the effect a delay has on an operating schedule that may be used with, for example, the autonomous grounds maintenance machine of FIG. 1.
Figure 15B:
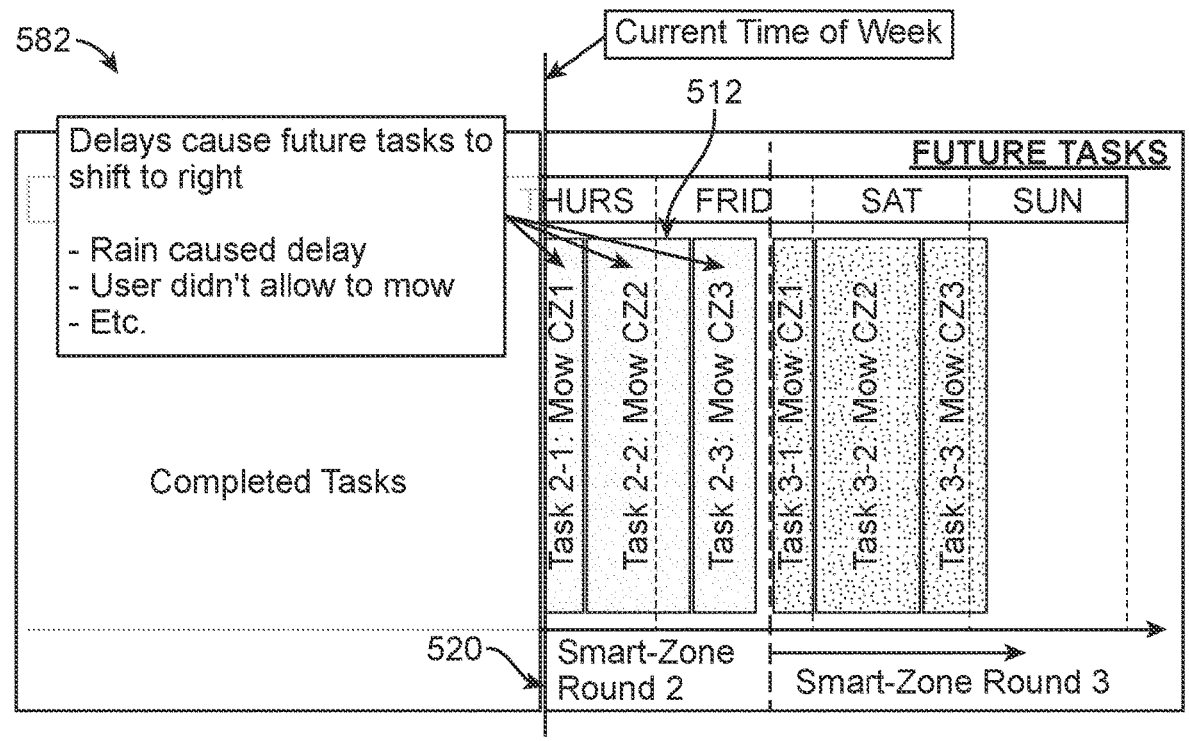

In some cases, the operating schedule may be revised in the middle of the current time period or before a next, or subsequent, time period begins. FIG. 15A shows one example of an operating schedule 580, and FIG. 15B shows one example of a revised operating schedule 582 due to a delay in starting one or more operational tasks 512 in the operating schedule 580. As illustrated, the first operational task 512 is delayed, into the middle of the second round 520. The revised operating schedule 582 may delay all operational tasks 512 following the delayed operational task in the second round 520.

Operational tasks 512 may be delayed for one or more reasons. In some cases, external conditions, such as rain or other weather, may result in delay. In some cases, user input may result in delay, such as user input that does not allow the autonomous machine to operate for a time period or user input that requests an additional operational task that was not originally part of the operating schedule. Further, in some cases, delay may be caused by isolated containment zones being inaccessible to the autonomous machine because the user has not manually intervened when the mower has requested transport. In some embodiments, delay may not be caused by the user not intervening because the machine may skip over the isolated containment zones and continue to perform other operational tasks 512.

In some embodiments, environmental information may be used to determine the operating schedule or revised operating schedule for the work region. Environmental information may include: received weather report information, data from sensors on the autonomous machine (e.g., a rain sensor), load at the cutting disc (e.g., a high load indicating wet grass or very long grass), or significant changes in features identified in images (e.g., seasonal changes or a change to the yard). In some embodiments, the operating schedule may be revised in response to detecting a change in environmental information, for example, that indicates a certain condition (e.g., winter or summer) or that exceeds a threshold (e.g., chance of precipitation).

Operating schedules may be impacted by environmental information in various ways. Some environmental information may indicate that more maintenance may be needed. For example, the recommended total operation time may be increased in response to more rain. Environmental information, such as the location of the work region, may be used to determine a climate, such as the amount of rain that is expected to fall in a certain season, that may be used to determine or adjust the operating schedule. Other environmental information, such as grass type, may be used to estimate a growth rate for a particular climate, which may be used to determine or adjust the operating schedule.

Once an operating schedule is determined, the operating schedule may be applied to each subsequent time period. In some embodiments, the order of all operational tasks in the subsequent time periods may remain the same (e.g., the same operational schedule for each time period) unless, for example, the operating schedule is revised. In some cases, it may be possible for an operational task to be delayed into the start of the next round. Various processes may be used to revise the operating schedule when an operational task is delayed in to the next round, which may revise the operating schedule for the current time period and subsequent time periods.

FIG. 16 shows one example of a "no catch-up" process 600 for revising an operating schedule when an operational task is delayed into the next round. In the illustrated embodiment, not all operational tasks in Round 2 are completed. For example, the CZ2 and CZ3 operational tasks are delayed into Round 3. In particular, the CZ1 operational task is completed but a delay in the middle of Round 2 causes the CZ2 operational task to be only partially completed (e.g., the delay started in the middle of the task) and the CZ3 operational task to be wholly incomplete.

In general, the process 600 may revise the operating schedule to complete the same number of operational tasks in a different round than would have been completed in the existing operating schedule. For example, the original operating schedule would have completed three operational tasks (CZ1, CZ2, and CZ3) in Round 3. The process 600 may revise the operating schedule such that Round 3 is assigned to finish the partially completed CZ2 operational task, the wholly incomplete CZ3 operational task, and the CZ1 operational task originally scheduled to be completed in Round 3. The CZ2 and CZ3 operational tasks originally scheduled to be completed in Round 3 are canceled such that the total number of operational tasks completed in Round 3 remains at three operational tasks (partial CZ2, CZ3, and CZ1). The movement of operational tasks between rounds may be described as shifting tasks to a different round or cancelling and adding tasks to a different round.

Although the sequence of operational tasks remains the same (CZ1 to CZ2 to CZ3 and repeat), the sequence of operational tasks assigned to each round may change. For example, subsequent time periods may use the revised sequence of operational tasks in each of the next rounds. In the illustrated embodiment, Round 1 of the next time period uses the same sequence of operational tasks (CZ2, CZ3, and CZ1) for Round 3 (e.g., starting with the operational tasks canceled from Round 3).

FIG. 17 shows one example of a "catch-up" process 602 for revising an operating schedule when an operational task is delayed into the next round. In general, the "catch up" process 602 may assign more tasks into a round than originally scheduled. In the illustrated embodiment, similar to the embodiment shown in FIG. 16, the CZ2 and CZ3 operational tasks are delayed, or shifted, into Round 3. In particular, the CZ2 operational task is only partially completed and the CZ3 operational task is wholly incomplete.

In general, the process 602 may revise the operating schedule to assign more operational tasks in a round than would have been completed in the existing operating schedule. The process 602 is similar to the process 600 in that the wholly incomplete operational tasks are assigned to a subsequent round (e.g., the CZ3 operational task from Round 2). The process 602 differs from the process 600 in that Round 3 includes finishing the partially completed CZ2 operational task, the wholly incomplete CZ3 operational task, the CZ1 operational task originally scheduled to be completed in Round 3, and the CZ2 operational task originally scheduled to be completed in Round 3 (at least the portion of CZ2 that was partially completed in the CZ2 operational task in Round 2). Only the CZ3 operational task originally scheduled to be completed in Round 3 is canceled such that the total number of operational tasks completed in Round 3 increases to only four operational tasks (partial CZ2, CZ3, CZ1, and at least remainder of CZ2).

The process 602 may revise subsequent time periods to use a revised sequence of operational tasks that may be different than the sequence of operational tasks in the original operating schedule. In the illustrated embodiment, Round 1 of the next time period uses the sequence of operational tasks (CZ3, CZ1, CZ2) starting with the CZ2 operational task canceled from Round 3.

Some users may prefer to have an operating schedule that is the same from time period to time period (e.g., every week). For example, the start of each round is at the same point of the time period in subsequent time periods. In other embodiments, the operating schedule may be revised from time period to time period, for example, to assign one or more subsequent operational tasks to times that are the same or offset compared to assigned times of corresponding operational tasks in the existing operating schedule. An operating schedule may also schedule the same operational tasks or rounds for completion at the same or different times in adjacent time periods. In some embodiments, the operating schedule may be defined over multiple time periods. For example, multiple rounds may be completed over two time periods (e.g., two weeks). Different start times, or time slots, may be assigned to each round in the second time period compared to the rounds in the second time period.

Operational tasks may be assigned a priority. Different types of operational tasks may be assigned to the same or different levels of priority, which may be used to determine or revise the operating schedule. Non-limiting examples of operational task types include: user-requested tasks, isolated containment zone tasks, and autonomous containment zone tasks.

Figure 18:
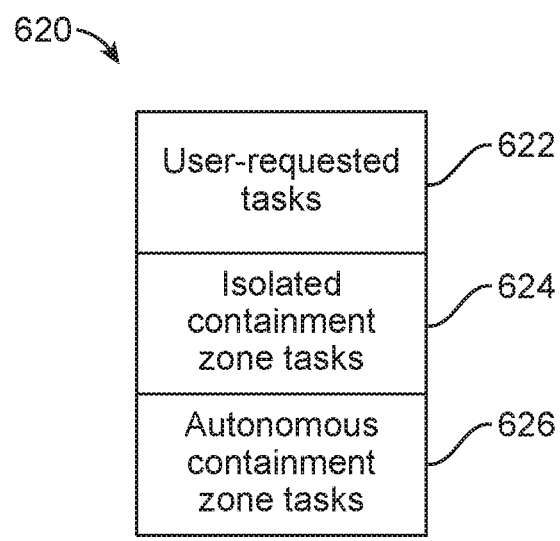
FIG. 18 is a diagram of one example of a scheme for prioritizing different types of operational tasks that may be used with, for example, the autonomous grounds maintenance machine of FIG. 1.

FIG. 18 shows one example of a scheme 620 for prioritizing different types operational tasks. In the illustrated embodiment, the operating schedule may be determined or revised to prioritize user-requested tasks 622 above isolated containment zone tasks 624 and prioritize isolated containment zone tasks 624 over autonomous containment zone tasks 626. Scheduling isolated containment zone tasks 624 soon after charging may ensure that the autonomous machine has the most battery power available for the isolated containment zone tasks, where the base station may not be accessible without user intervention. A specific user-requested task 622 may be initiated by user input and may be described as an ad-hoc request. For example, a user may want to complete the task of mowing the front lawn before the next scheduled completion of that task.

The completion of isolated containment zone tasks 624 may depend on the availability, or action, of the user. For example, the isolated containment zone task 624 may be part of the operating schedule but cannot be started without the user carrying the autonomous machine to the isolated containment zone. Autonomous containment zone tasks 626, in general, may be completed by the autonomous machine without intervention by the user.

Isolated containment zones may not be accessible by the autonomous machine. In other words, an isolated containment zone may be described as a containment zone that the machine cannot navigate to autonomously (e.g., due to impassable terrain). The autonomous machine may be transported to the isolated containment zone, or to a transit path navigable to the isolated containment zone, by a user.

Since a user may not be available at all times to transport a mower around, the user may continue delaying the operational task to mow the isolated containment zone in some cases. In some embodiments, the operational task to mow the isolated containment zones may be scheduled at the beginning of a round or, in other words, be given the highest priority. This may provide the longest duration possible within one round for a user transport the mower to the isolated containment zone and stay on schedule.

Some containment zones may be isolated at certain times and not isolated at other times. For example, a gate may isolate containment zones only when it is closed. Certain barriers, or obstacles, may isolate containment zones on a known schedule or their status may be communicated to the autonomous machine, for example, automatically using a sensor or by manual user input. The operating schedule may schedule or prioritize isolated containment zone tasks 624 to coincide with the barrier or obstacle being open or otherwise when passage is allowed between the containment zones.

Certain containment zones may also be treated as isolated based on user input or a schedule, for example, even if an actual barrier or obstacle does not physically impede movement of the autonomous machine to the isolated containment zone. One example of an isolated containment zone may be a child play area, which may be considered isolated. User input may allow or not allow the autonomous machine to perform the isolated containment zone task 624 associated with the child play area on a schedule, automatically using sensors, or based in manual user input.

Figure 19:
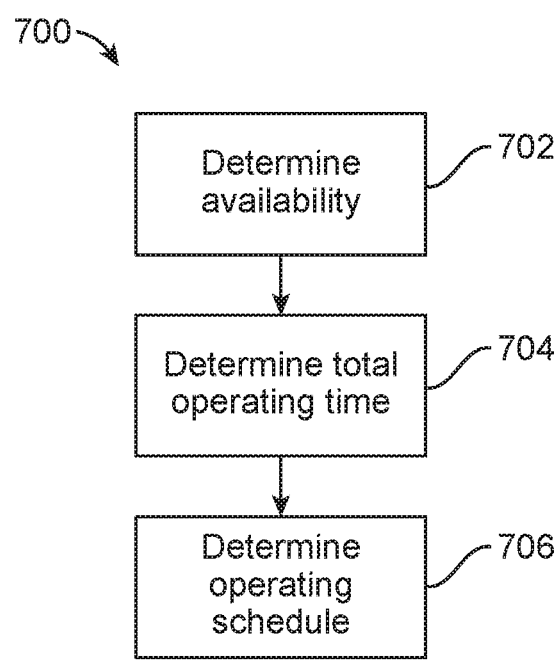
FIG. 19 is a diagram of one example of a method for operating an autonomous machine that may be used with, for example, the autonomous grounds maintenance machine of FIG. 1.

FIG. 19 shows a general example of a method 700 for operating an autonomous machine as described in the present disclosure. The method 700 may include determining the availability over a time period when the autonomous machine is allowed to operate to perform one or more operational tasks. The method 700 may include determining a total operation time over the time period. The method 700 may also include determining an operating schedule for a work region that assigns one or more operational tasks to the one or more windows of availability based on the total operation time.

Thus, various embodiments of smart scheduling for autonomous machine operation are disclosed. Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety for all purposes, except to the extent any aspect directly contradicts this disclosure.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing amounts used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out functionality.

As used herein, the term "configured to" may be used interchangeably with the terms "adapted to" or "structured to" unless the content of this disclosure clearly dictates otherwise.

The term "or" is generally employed in its inclusive sense, for example, to mean "and/or" unless the context clearly dictates otherwise. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

What is claimed is:

1. A method for operating an autonomous machine comprising:
   receiving a first user input that indicates one or more windows of availability when the autonomous machine is allowed to operate to perform two or more operational tasks, the windows of availability being determined over a time period, wherein each of the two or more operational tasks is associated with a containment zone comprising only a portion of a work region;
   performing via a scheduling controller of the autonomous machine:
      determining a recommended total operation time over the time period to perform the operational tasks, the recommended total operation time being divided into recommended operation times for the containment zones;
      determining an operating schedule for the work region that assigns one or more operational tasks to the one or more windows of availability based on the recommended total operation time, wherein the operating schedule is based on a second user input that indicates comprises a desired total operating time that is greater than or less than the recommended total operation time, wherein each recommended operation time is scaled accordingly to provide a modified operation time based on the user input such that the modified operation times for the containment zones add up to the desired total operation time; and
      commanding the autonomous machine to operate in the work region according to the operating schedule.

2. The method according to claim 1, wherein the first user input is further indicative of one or more windows of unavailability.

3. The method according to claim 1, wherein determining the operating schedule comprises assigning one or more of the operational tasks to one or more rounds and the one or more windows of availability.

4. The method according to claim 3, wherein an order of distinct operational tasks assigned to each round is the same.

5. The method according to claim 1, wherein one or more of the two or more operational tasks is split between more than one window of availability.

6. The method according to claim 1, wherein each of the two or more operational tasks is associated with a containment zone comprising only a portion of the work region.

7. The method according to claim 1, wherein determining the recommended total operation time is based on training of the autonomous machine.

8. The method according to claim 1, wherein the modification to the recommended operation time for each containment zone comprises a modification of frequency, duration, or both of the one or more operational tasks.

9. The method according to claim 1, further comprising prioritizing specific user-requested tasks over scheduled operational tasks in the operating schedule.

10. The method according to claim 1, further comprising prioritizing at least one operational task to cover an isolated containment zone before at least one operational task to cover an autonomous containment zone in the operating schedule.

11. The method according to claim 10, wherein prioritizing the at least one operational task to cover the isolated containment zone comprises determining that the isolated containment zone is not isolated before prioritizing the at least one operational task to cover the isolated containment zone.

12. The method according to claim 1, further comprising determining a revised operating schedule based on the operating schedule defined as an existing operating schedule in response to a delay of one or more operational tasks.

13. The method according to claim 12, wherein determining the revised operating schedule comprises assigning more operational tasks to a round than would have been assigned to the round in the existing operating schedule.

14. The method according to claim 12, wherein determining the revised operating schedule comprises assigning the same number of operational tasks to a round as would have been assigned to the round in the existing operating schedule.

15. The method according to claim 12, wherein determining the revised operating schedule comprises assigning wholly incomplete operational tasks to a subsequent round.

16. The method according to claim 1, wherein determining the operating schedule for the work region is based on environmental information, wherein the environmental information includes environmental inputs captured by the autonomous machine indicative of location, grass type, or growth rate of grass, the location being used to determine a current season or weather patterns.

17. The method according to claim 1, wherein the desired total operating time is greater than or less than the recommended total operation time to increase a cut quality of the work region or to save power.

18. An autonomous machine comprising:
    a housing coupled to a maintenance implement;
    a propulsion controller operably coupled to a set of wheels;
    a scheduling controller operably coupled to the propulsion controller, the scheduling controller comprising processing circuitry configured to:
        determine, via a first user input, one or more windows of availability when the autonomous machine is allowed to operate to perform two or more operational tasks, the windows of availability being determined over a time period, wherein each of the two or more operational tasks is associated with a containment zone comprising only a portion of a work region;
        determine a recommended total operation time over the time period to perform the operational tasks, the recommended total operation time being divided into recommended operation times for the containment zones; and
        determine an operating schedule for the work region that assigns one or more operational tasks to the one or more windows of availability based on the recommended total operation time, wherein determining the operating schedule is further based on a second user input that comprises a desired total operating time that is greater than or less than the recommended total operation time, wherein each recommended operation time is scaled accordingly to provide a modified operation time based on the user input such that the modified operation times for the containment zones add up to the desired total operation time; and
    wherein the propulsion controller and the scheduling controller are configured to command the autonomous machine to operate in the work region according to the operating schedule.

* * * * *

UNITED STATES PATENT AND TRADEMARK OFFICE
CERTIFICATE OF CORRECTION

PATENT NO. : 12,124,262 B2  
APPLICATION NO. : 17/436276  
DATED : October 22, 2024  
INVENTOR(S) : Ryan Douglas Ingvalson et al.

Page 1 of 1

It is certified that error appears in the above-identified patent and that said Letters Patent is hereby corrected as shown below:

In the Claims

In Column 26, Line 26 (Claim 1): the word 'indicates' should be removed.

Signed and Sealed this  
Fifteenth Day of April, 2025

Coke Morgan Stewart  
*Acting Director of the United States Patent and Trademark Office*